United States Patent
Pollack et al.

(10) Patent No.: US 6,658,928 B1
(45) Date of Patent: Dec. 9, 2003

(54) METHOD OF MONITORING PRESSURE IN A PNEUMATIC TIRE

(75) Inventors: Richard Stephen Pollack, Boulder, CO (US); Dale Lee Yones, Boulder, CO (US); Robert Walter Brown, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/148,782

(22) PCT Filed: Dec. 14, 1999

(86) PCT No.: PCT/US99/29668
§ 371 (c)(1),
(2), (4) Date: Jun. 3, 2002

(87) PCT Pub. No.: WO01/43998
PCT Pub. Date: Jun. 21, 2001

(51) Int. Cl.⁷ .............................................. G01M 17/02
(52) U.S. Cl. ........................................................ 73/146
(58) Field of Search ............................ 29/25.41, 25.42, 29/621.1; 73/706, 744, 745, 715–727, 756, 146, 146.2, 146.3, 146.5, 146.8, 708; 340/442, 443, 444, 446, 447, 449

(56) References Cited

U.S. PATENT DOCUMENTS

| | | | |
|---|---|---|---|
| 3,596,509 A | 8/1971 | Raffaelli | |
| 3,893,228 A | 7/1975 | George et al. | |
| 4,126,772 A | 11/1978 | Pappas et al. | |
| 4,317,216 A | 2/1982 | Kaegebein | |
| 4,335,283 A | 6/1982 | Migrin | |
| 4,567,459 A | 1/1986 | Folger et al. | |
| 4,578,992 A | 4/1986 | Galasko et al. | |
| 4,695,823 A | 9/1987 | Vernon | |
| 4,701,826 A | 10/1987 | Mikkor | |
| 4,703,650 A | 11/1987 | Dosjoub et al. | |
| 4,893,110 A | 1/1990 | Hebert | |
| 4,909,074 A | 3/1990 | Gerresheim et al. | |
| 4,966,034 A | 10/1990 | Bock et al. | |
| 5,054,315 A | 10/1991 | Dosjoub | |
| 5,140,851 A | 8/1992 | Hettrich et al. | |
| 5,228,337 A | 7/1993 | Sharpe et al. | |
| 5,230,243 A | 7/1993 | Reinecke | |

(List continued on next page.)

FOREIGN PATENT DOCUMENTS

| WO | WO99/52723 | 10/1999 |
|---|---|---|
| WO | WO99/52724 | 10/1999 |
| WO | WO99/53279 | 10/1999 |
| WO | WO00/02028 | 1/2000 |
| WO | WO01/43997 | 6/2001 |

*Primary Examiner*—William Oen
(74) *Attorney, Agent, or Firm*—Howard M. Cohn

(57) ABSTRACT

A method for monitoring pressure with a transponder (200, 604) capable of measuring temperature data ($N_T$) and pressure data ($N_P$) in an object (e.g., a tire, (104)) and transmitting a data stream (FIG. 3C) to an external reader/interrogator (106, 400). The transponder includes a memory (238) for storing measurements, calibration data (662), transponder ID number and the like. Since the transponder combines temperature and pressure information in the "pressure" data, the ratio $N_T/N_P$ is a direct indicator of pressure-only, and is also relatively insensitive to transponder power variations. The calibration method employs a calibration chamber (602) containing reference pressure (614) and temperature (612) sensors. The transducer to be calibrated is placed in the chamber and exposed (652) to a number of predetermined temperatures and pressures (as measured by the reference sensors) at a number of calibration points. At each calibration point, a temperature reading ($N_T$) and a pressure reading ($N_P$) sensed by the transponder are recorded along with the reference temperature and pressure. From these readings and reference measurements the calibration constants ($N_{T25}$, $m_T$, $N_T/N_{P700.25}$, $m_p$) are calculated (658).

11 Claims, 9 Drawing Sheets

U.S. PATENT DOCUMENTS

| | | |
|---|---|---|
| 5,231,872 A | 8/1993 | Bowler et al. |
| 5,285,189 A | 2/1994 | Nowicki et al. |
| 5,297,424 A | 3/1994 | Sackett |
| 5,451,959 A | 9/1995 | Schuermann |
| 5,528,452 A | 6/1996 | Ko |
| 5,540,092 A | 7/1996 | Handfield et al. |
| 5,562,787 A | 10/1996 | Koch et al. |
| 5,581,023 A | 12/1996 | Handfield et al. |
| 5,661,651 A | 8/1997 | Geschke et al. |
| 5,706,565 A | 1/1998 | Sparks et al. |
| 5,731,754 A | 3/1998 | Lee, Jr. et al. |

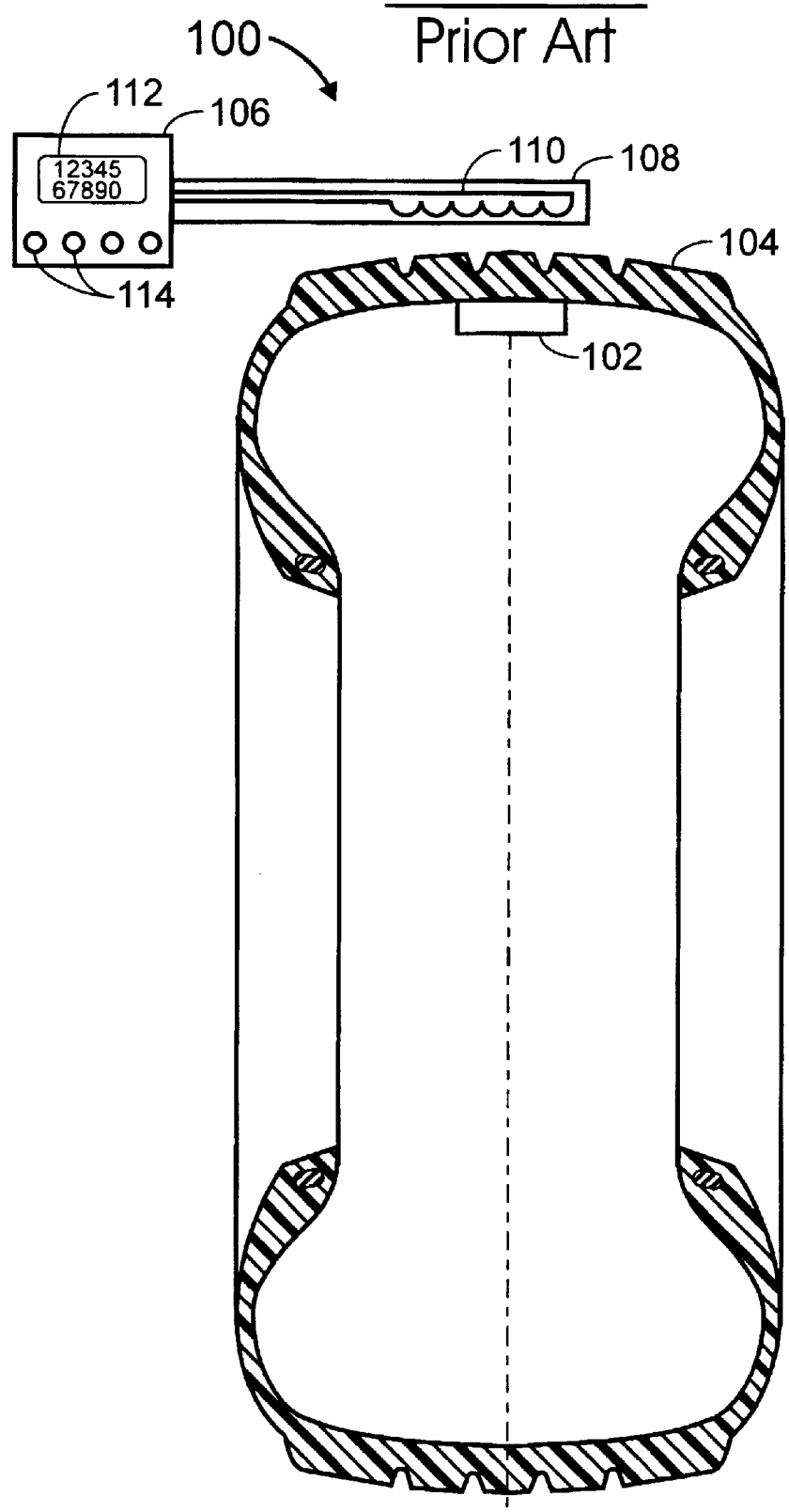

Figure 3A
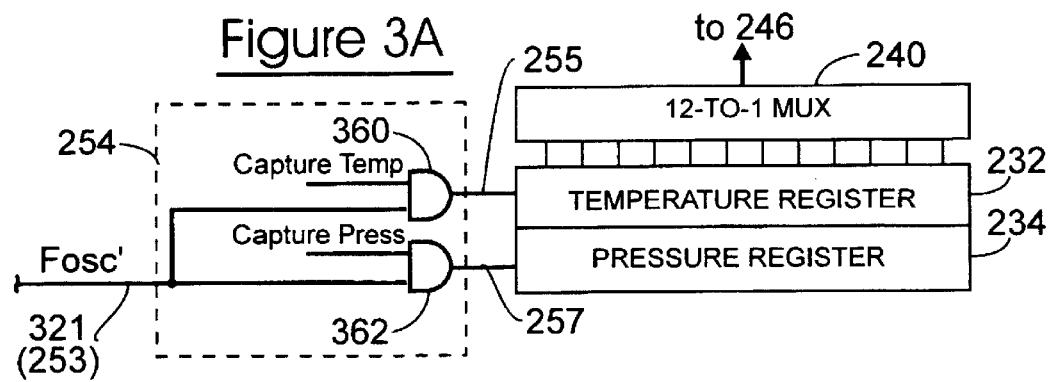
Figure 3B
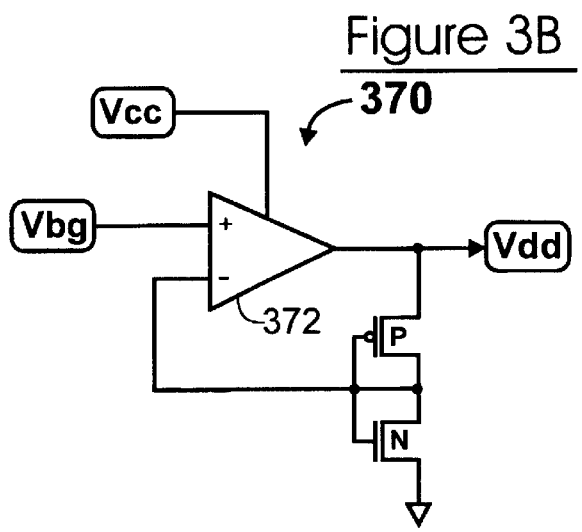
Figure 3C
← 12 COLUMNS →
| Row | Contents |
|---|---|
| ROW 1 | SYNC 000..011 |
| ROW 2 | DATA 012..023 |
| ROW 3 | DATA 024..035 |
| ROW 4 | DATA 036..047 |
| ROW 5 | DATA 048..059 |
| ROW 6 | DATA 060..071 |
| ROW 7 | DATA 072..082, MTMS 083 |
| ROW 8 | TEMP COMP 084..095 |
| ROW 9 | PRESS COMP 096..107 |
| ROW 10 | TEMP/PRESS SLOPES 108..113, 114..119 |
| ROW 11 | TEMP COUNT (NT) 120..131 |
| ROW 12 | PRESS COUNT (NP) 132..143 |

652 — EXPOSE TRANSPONDER TO A NUMBER OF TEMPERATURES AND PRESSURES AT A NUMBER OF CALIBRATION POINTS

654 — STORE VALUES FOR Nt AND Np, STORE REFERENCE VALUES, AT THE CALIBRATION POINTS

656 — CHECK THAT THE VALUES FOR THE TEMPERATURE AND PRESSURE DEFINING POINTS (Nt25, Np700), AND THE SLOPES (mt, mp) FOR THE TEMPERATURE AND PRESSURE RESPONSE CURVES FALL WITHIN PREDETERMINED RANGES

- YES → 658 — CALCULATE CALIBRATION CONSTANTS (Nt25, mt, Nt/Np700, mp) AND CONVERT TO BINARY
- NO → REJECT TRANSPONDER

660 — CONCANTENATE THE FOUR CALIBRATION CONSTANTS (Nt25, mt, Nt/Np700, mp) INTO A STRING OF CALIBRATION BITS

662 — STORE THE CALIBRATION STRING IN THE TRANSPONDER

METHOD OF MONITORING PRESSURE IN A PNEUMATIC TIRE

CROSS-REFERENCE TO RELATED APPLICATIONS

This application relates to a PCT application entitled CALIBRATION OF A TRANSPONDER FOR A TIRE PRESSURE MONITORING SYSTEM (publication number WO 01/43997), having a filing date concurrent with that of the present invention.

This is a continuation-in-part of three commonly-owned, copending PCT Patent Applications having publication numbers WO 99/52723, WO 99/52724, and WO 99/53279 all filed Apr. 14, 1998 by The Goodyear Tire & Rubber Company, et al.

TECHNICAL FIELD OF THE INVENTION

The present invention relates to monitoring pressures in pneumatic tires on motor vehicles and, more particularly in conjunction with transponders associated with the tires for transmitting pressure and temperature measurements to an external (e.g., on-board) receiver (reader, or reader/interrogator).

BACKGROUND OF THE INVENTION

Safe, efficient and economical operation of a motor vehicle depends, to a significant degree, on maintaining correct air pressure in all (each) of the tires of the motor vehicle. Operating the vehicle with low tire pressure may result in excessive tire wear, steering difficulties, poor road-handling, and poor gasoline mileage, all of which are exacerbated when the tire pressure goes to zero in the case of a "flat" tire.

The need to monitor tire pressure when the tire is in use is highlighted in the context of "run-flat" (driven deflated) tires, tires which are capable of being used in a completely deflated condition. Such run-flat tires, as disclosed for example in commonly-owned U.S. Pat. No. 5,368,082, incorporated in its entirety by reference herein, may incorporate reinforced sidewalls, mechanisms for securing the tire bead to the rim, and a non-pneumatic tire (donut) within the pneumatic tire to enable a driver to maintain control over the vehicle after a catastrophic pressure loss, and are evolving to the point where it is becoming less and less noticeable to the driver that the tire has become deflated. The broad purpose behind using run-flat tires is to enable a driver of a vehicle to continue driving on a deflated pneumatic tire for a limited distance (e.g., 50 miles, or 80 kilometers) prior to getting the tire repaired, rather than stopping on the side of the road to repair the deflated tire. Hence, it is generally desirable to provide a low tire pressure warning system within in the vehicle to alert (e.g., via a light or a buzzer) the driver to the loss of air pressure in a pneumatic tire.

To this end, a number of electronic devices and systems are known for monitoring the pressure of pneumatic tires, and providing the operator of the vehicle with either an indication of the current tire pressure or alerting the operator when the pressure has dropped below a predetermined threshold level.

For example, U.S. Pat. No. 4,578,992 (Galasko, et al; April 1986), incorporated in its entirety herein, discloses a tire pressure indicating device including a coil and a pressure-sensitive capacitor forming a passive oscillatory circuit having a natural resonant frequency which varies with tire pressure due to changes caused to the capacitance value of the capacitor. The circuit is energized by pulses supplied by a coil positioned outside the tire and secured to the vehicle, and the natural frequency of the passive oscillatory circuit is detected. The natural frequency of the coil/capacitor circuit is indicative of the pressure on the pressure-sensitive capacitor.

It is also known to monitor tire pressure with an electronic device which is not merely a passive resonant circuit, but rather is capable of transmitting a radio frequency (RF) signal indicative of the tire pressure to a remotely-located receiver. Such a "transmitting device" may have its own power supply and may be activated only when the pressure drops below a predetermined threshold. Alternatively, the transmitting device may be activated ("turned ON") by an RF signal from the remotely-located receiver, in which case the receiver is considered to be an "interrogator". Additionally, the transmitting device may be powered by an RF signal from the interrogator. Additionally, the electronic device which monitors the tire pressure may have the capability of receiving information from the interrogator, in which case the electronic device is referred to as a "transponder".

As used herein, a "transponder" is an electronic device capable of receiving and transmitting radio frequency signals, and impressing variable information (data) in a suitable format upon the transmitted signal indicative of a measured condition (e.g., tire pressure) or conditions (e.g., tire pressure, temperature, revolutions), as well as optionally impressing fixed information (e.g., tire ID) on the transmitted signal, as well as optionally responding to information which may be present on the received signal. The typical condition of paramount interest for pneumatic tires is tire pressure. "Passive" transponders are transponders powered by the energy of a signal received from the interrogator. "Active" transponders are transponders having their own power supply (e.g., a battery), and include active transponders which remain in a "sleep" mode, using minimal power, until "woken up" by a signal from an interrogator, or by an internal periodic timer, or by an attached device. As used herein, the term "tag" refers either to a transponder having transmitting and receiving capability, or to a device that has only transmitting capability. Generally, tags which are transponders are preferred in the system of the present invention. As used herein, the term "tire-pressure monitoring system" (TPMS) indicates an overall system comprising tags within the tires and a receiver which may be an interrogator disposed within the vehicle.

It is known to mount a tag, and associated condition sensor (e.g., pressure sensor) within each tire of a vehicle, and to collect information from each of these transponders with a common single interrogator (or receiver), and to alert a driver of the vehicle to a low tire pressure condition requiring correction (e.g., replacing the tire). For example, U.S. Pat. No. 5,540,092 (Handfield, et al.; 1996), incorporated in its entirety by reference herein, discloses a system and method for monitoring a pneumatic tire. FIG. 1 therein illustrates a pneumatic tire monitoring system (20) comprising a transponder (22) and a receiving unit (24).

Examples of RF transponders suitable for installation in a pneumatic tire are disclosed in U.S. Pat. No. 5,451,959 (Schuermann; September 1998), U.S. Pat. No. 5,661,651 (Geschke, et al.; August, 1997), and U.S. Pat. No. 5,581,023 (Handfield, et al.; November 1996), all incorporated in their entirety by reference herein. The described transponder systems include interrogation units, pressure sensors and/or temperature sensors associated with the transponder, and various techniques for establishing the identity of the tire/ transponder in multiple transponder systems. In most cases, such transponders require battery power.

In some instances, a transponder may be implemented as an integrated circuit (IC) chip. Typically, the IC chip and other components are mounted and/or connected to a substrate such as a printed circuit board (PCB).

Some proposed systems have relatively complex transponder-sensor capabilities, including measurement and reporting of tire rotations and speed, along with tire ID, temperature, and pressure. For example: U.S. Pat. No. 5,562,787 (Koch, et al.; 1996), and U.S. Pat. No. 5,731,754 (Lee, Jr., et al.; 1998), incorporated in their entirety by reference herein.

TRANSPONDER ENVIRONMENTAL CONSIDERATIONS

The environment within which a tire-mounted transponder must reliably operate, including during manufacture and in use, presents numerous challenges to the successful operation of the transducer. For example, the sensors (e.g., pressure, temperature) used with the transponder preferably will have an operating temperature range of up to 125° C., and should be able to withstand a manufacturing temperature of approximately 177° C. For truck tire applications, the pressure sensor must have an operating pressure range of from about 50 psi to about 120 psi (from about 345 kPa to about 827 kPa), and should be able to withstand pressure during manufacture of the tire of up to about 400 psi (about 2759 kPa). The accuracy, including the sum of all contributors to its inaccuracy, should be on the order of plus or minus 3% of full scale. Repeatability and stability of the pressure signal should fall within a specified accuracy range.

However it is implemented, a tire transponder (tag) must therefore be able to operate reliably despite a wide range of pressures and temperatures. Additionally, a tire transponder must be able to withstand significant mechanical shocks such as may be encountered when a vehicle drives over a speed bump or a pothole.

A device which can be used to indicate if a transponder or the tire has been exposed to excessive, potentially damaging temperatures is the "MTMS" device or Maximum Temperature Memory Switch developed by. Prof. Mehran Mehregany of Case Western Reserve University. It is a micro-machined silicon device that switches to a closed state at a certain high-temperature point. The sensor switches from an "open" high resistance state of, for example, over 1 mega-ohm to a "closed" low resistance state of, for example, less than 100 ohm.

Although it is generally well known to use pressure transducers in pneumatic tires, in association with electronic circuitry for transmitting pressure data, these pressure-data systems for tires have been plagued by difficulties inherent in the tire environment. Such difficulties include effectively and reliably coupling RF signals into and out of the tire, the rugged use the tire and electronic components are subjected to, as well as the possibility of deleterious effects on the tire from incorporation of the pressure transducer and electronics in a tire/wheel system. In the context of "passive" RF transponders which are powered by an external reader/interrogator, another problem is generating predictable and stable voltage levels within the transponder so that the circuitry within the transponder can perform to its design specification.

Suitable pressure transducers for use with a tire-mounted transponder include:

(a) piezoelectric transducers;
(b) piezoresistive devices, such as are disclosed in U.S. Pat. No. 3,893,228 (George, et al.; 1975) and in U.S. Pat. No. 4,317,216 (Gragg, Jr.; 1982);
(c) silicon capacitive pressure transducers, such as are disclosed in U.S. Pat. No. 4,701,826 (Mikkor; 1987), U.S. Pat. No. 5,528,452 (Ko; 1996), U.S. Pat. No. 5,706,565 (Sparks, et al.; 1998), and WO00/02028 (Ko, et al.; filed Jul. 7, 1999);
(d) devices formed of a variable-conductive laminate of conductance ink; and
(e) devices formed of a variable-conductance elastomeric composition.

THE EFFECT OF TEMPERATURE ON GAS PRESSURE

In a broad sense, for a mass of any gas in a state of thermal equilibrium, pressure P, temperature T, and volume V can readily be measured. For low enough values of the density, experiment shows that (1) for a given mass of gas held at a constant temperature, the pressure is inversely proportional to the volume (Boyle's law), and (2) for a given mass of gas held at a constant pressure, the volume is directly proportional to the temperature (law of Charles and Gay-Lussac). This leads to the "equation of state" of an ideal gas, or the "ideal gas law":

$$PV = \mu RT$$

where:

$\mu$ is the mass of the gas in moles; and

R is a constant associated with the gas.

Thus, for a contained (fixed) volume of gas, such as air contained within a pneumatic tire, an increase in temperature (T) will manifest itself as an increase in pressure Because of the ideal gas law relationship, it is recognized that in the context of pneumatic tires, one problem that arises during operation of tire pressure sensors of any kind is that tires heat up as they are run for longer periods of time. When a tire heats up, air which is confined within the essentially constant and closed volume of the tire expands, thus causing increased pressure within the tire, though the overall amount of air within the tire remains the same. Since the pressure nominally is different, a tire pressure sensor can provide different pressure readings when a tire is hot than would be the case if the tire were cold. This is why tire and vehicle manufacturers recommend that owners check their tire pressure when the tire is cold. Of course, with a remote tire pressure sensor, an operator may receive a continuous indication of tire pressure within the vehicle, but the indication may be inaccurate because of the temperature change. Thus, it is necessary to compensate for changes in temperature of the inflating medium ("gas" or air) within the pneumatic tire.

Patents dealing in one way or another with gas law effects in pneumatic tires include:

U.S. Pat. No. 3,596,509 (Raffelli; 1971), U.S. Pat. No. 4,335,283 (Migrin; 1982), U.S. Pat. No. 4,126,772 (Pappas, et al.; 1978), U.S. Pat. No. 4,909,074 (Gerresheim, et al.; 1990), U.S. Pat. No. 5,050,110 (Rott; 1991), U.S. Pat. No. 5,230,243 (Reinecke; 1993), U.S. Pat. No. 4,966,034 (Bock, et al.; 1990), U.S. Pat. No. 5,140,851 (Hettrich, et al.; 1992), U.S. Pat. No. 4,567,459 (Folger, et al.; 1986), all of which are incorporated in their entirety by reference herein.

U.S. Pat. No. 4,893,110 (Hebert; 1990), incorporated in its entirety by reference herein, discloses a tire monitoring device using pressure and temperature measurements to detect anomalies. As mentioned therein, a ratio of temperature and pressure provides a first approximation of a number of moles of gas in the tire, which should remain constant barring a leak of inflation fluid from the tire. (column 1, lines 18–26). More particularly, on each wheel are installed sensors (4) for pressure and sensors (6) for temperature of the tire, as well as elements (8 and 10) for transmitting the measured values as coded signals to a computer (12) on board the vehicle, such as disclosed in the aforementioned U.S. Pat. No. 4,703,650. The computer processes the measured values for pressure and temperature for each tire, and estimates for the pressure/temperature ratio (P/T estimate) are calculated for each wheel. Generally, the ratio for one of the tires is compared with the ratio for at least another one of the tires, and an alarm is output when a result (N) of the comparison deviates from a predetermined range of values.

TECHNIQUES FOR TRANSMITTING PRESSURE AND TEMPERATURE READINGS FROM A TIRE

Given that pressure and temperature conditions within a pneumatic tire can both be measured, various techniques have been proposed to transmit signals indicative of the measured pressure and temperature conditions to an external interrogator/receiver. For example, the following patents are incorporated in their entirety by reference herein:

- transmit the signals individually, distinguished by phase displacements: U.S. Pat. No. 4,174,515 (Marzolf; 1979);
- multiplex the signals: U.S. Pat. No. 5,285,189 (Nowicki, et al.; 1994), U.S. Pat. No. 5,297,424 (Sackett; 1994);
- encoding the signals as separate segments of a data word: U.S. Pat. No. 5,231,872 (Bowler, et al.; 1993), and U.S. Pat. No. 4,695,823 (Vernon; 1987) which also incorporates both the telemetry and the pressure and/or temperature sensors on the same integrated circuit chip;
- transmission between coils mounted on the wheel and on the vehicle: U.S. Pat. No. 4,567,459 (Folger, et al.; 1986);
- use a frequency-shift key (FSK) signal: U.S. Pat. No. 5,228,337 (Sharpe, et al.; 1993);
- backscatter-modulate the RF signal from the interrogator with the tire condition parameter data from the sensors, then return the backscatter modulated signal to the interrogator: U.S. Pat. No. 5,731,754 (Lee, Jr., et al.; 1998).

U.S. Pat. No. 4,703,650 (Dosjoub, et al.; 1987), incorporated in its entirety by reference herein, discloses a circuit for coding the value of two variables measured in a tire, and a device for monitoring tires employing such a circuit. The coding circuit comprises an astable multivibrator which transforms the measurement of the variables, for instance pressure and temperature, into a time measurement. The astable multivibrator delivers a pulse signal whose pulse width is a function of the temperature and the cyclic ratio of which is a function of the pressure.

U.S. Pat. No. 5,054,315 (Dosjoub; 1991), incorporated in its entirety by reference herein, discloses a technique for coding the value of several quantities measured in a tire. As disclosed therein:

"Coding of the value of any number of quantities measured in a tire, for example its pressure and its temperature, is carried out using a ratio of time intervals TP/Tr, Tt/Tr. This frees the device from the effect of the time shift of the modulation system, the time shift affecting simultaneously the numerator and the denominator of said ratio." (Abstract)

BRIEF DESCRIPTION (SUMMARY) OF THE INVENTION

It is a broad object of the present invention to provide method and apparatus for monitoring an operating characteristic of an object, such as a pneumatic tire, as defined in one or more of the appended claims and, as such, having the capability of being implemented according to one or more of the following aspects.

It is a specific aspect of the invention to provide an improved radio frequency (RF) transponder ("tag") capable of transmitting data related to a monitored object and parameters associated with the object to an external reader/interrogator.

It is another aspect of the present invention to provide a system for monitoring vehicle tire pressure and warning the driver when a low tire inflation pressure condition occurs.

It is another aspect of the invention to provide temperature data along with pressure data from a transponder to an external reader/interrogator in a manner in which ideal gas law temperature-dependency of the pressure data can be eliminated from the pressure data, resulting in a temperature-compensated pressure measurement being displayed by the external reader/interrogator.

It is another aspect of the invention to provide a technique for calibrating individual transponders of a given design so that reader/interrogators can apply universal, standardized formulae to signals from any transponder of the given design and obtain readings with maximized accuracy and minimized sensitivity to operating conditions.

According to an aspect of the invention, a radio-frequency (RF) transponder comprises circuitry capable of transmitting information unique to an object with which the transponder is associated to an external reader/interrogator. Additionally, one or more transponder sensors (transducers) provide real-time parameter measurement at the transducer location. These measurements are transmitted to the external reader/interrogator, in the form of data, in a data stream on a signal which is output by the transponder, such as by impressing (modulating) the data stream onto an RF signal transmitted by the transponder to the external reader/interrogator.

According to an aspect of the invention, at least two real-time parameters are measured: pressure and temperature. Pressure is preferably measured by a separate ("off-chip") pressure sensor, which is of a type that varies its capacitance value in a known way, such as a polynomial, or preferably as a substantially linear function of ambient pressure. Preferably, the temperature sensor is embedded ("on-chip") in the IC chip of the transponder and disposed so as to be subject to substantially the same ambient temperature as the pressure sensor so that a true, temperature-compensated pressure can readily be calculated.

According to an aspect of the invention, the transponder temperature reading ($N_T$) is a number which is directly proportional to the temperature, but the transponder pressure reading ($N_P$) is a function of both temperature and pressure. The ratio of readings ($N_T/N_P$) is a number which is directly proportional to the capacitance of the pressure sensor, which is preferably directly proportional to the pressure. The ratio is insensitive to variations in transponder power level or reader-to-transponder coupling over a wide range of operating conditions.

According to an aspect of the invention, the individual tansponders are calibrated, and the calibration information is stored in the transponder to be transmitted along with the measurement and identification data to a reader/interrogator. In this way, the reader/interrogator can most accurately calculate pressure and temperature readings from the raw measurement data transmitted to it.

The calibration method employs a calibration chamber with highly accurate reference pressure and temperature sensors deployed therein. The transducer to be calibrated is placed in the chamber and exposed to a number of predetermined temperatures (e.g., 25° C.) and pressures (e.g., 700 kPa) (as measured by the reference sensors) at a number of calibration points. At each calibration point, a temperature reading ($N_T$) and a pressure reading ($N_P$) sensed by the transponder are recorded along with the reference temperature and pressure. Prom these readings and reference measurements the calibration constants ($N_{T25}$, $m_T$, $N_T/N_{P700.25}$, and $m_p$) are calculated.

In preferred embodiments of the calibration method, the readings are range-checked to be sure that the calibration constants will be within acceptable ranges. Out-of-range readings cause rejection of the transponder. The calibration procedure is preferably designed to produce calibration constants which can be used in linear equations by the reader/interrogator, and the pressure equation will use the count ratio as its independent variable. A suitable form of linear equation is the "point slope" form, which describes a line by a "defining point" on the line and a slope at that defining point.

The calibration procedure uses a minimum of three, and preferably at least five, calibration points. The calibration points are selected to bracket the range of expected temperatures and pressures in the monitored object. Also, the temperature defining point is selected to be at a standardized temperature for the monitored object, and the pressure defining point is selected to be at a nominal pressure expected at the standardized temperature in the monitored object.

Other objects, features and advantages of the invention will become apparent from the description that follows.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views, if any, presented herein may be in the form of "slices", or "near-sighted" cross-sectional views, omitting certain background lines which would otherwise be visible in a true cross-sectional view, for illustrative clarity.

Figure 1B:
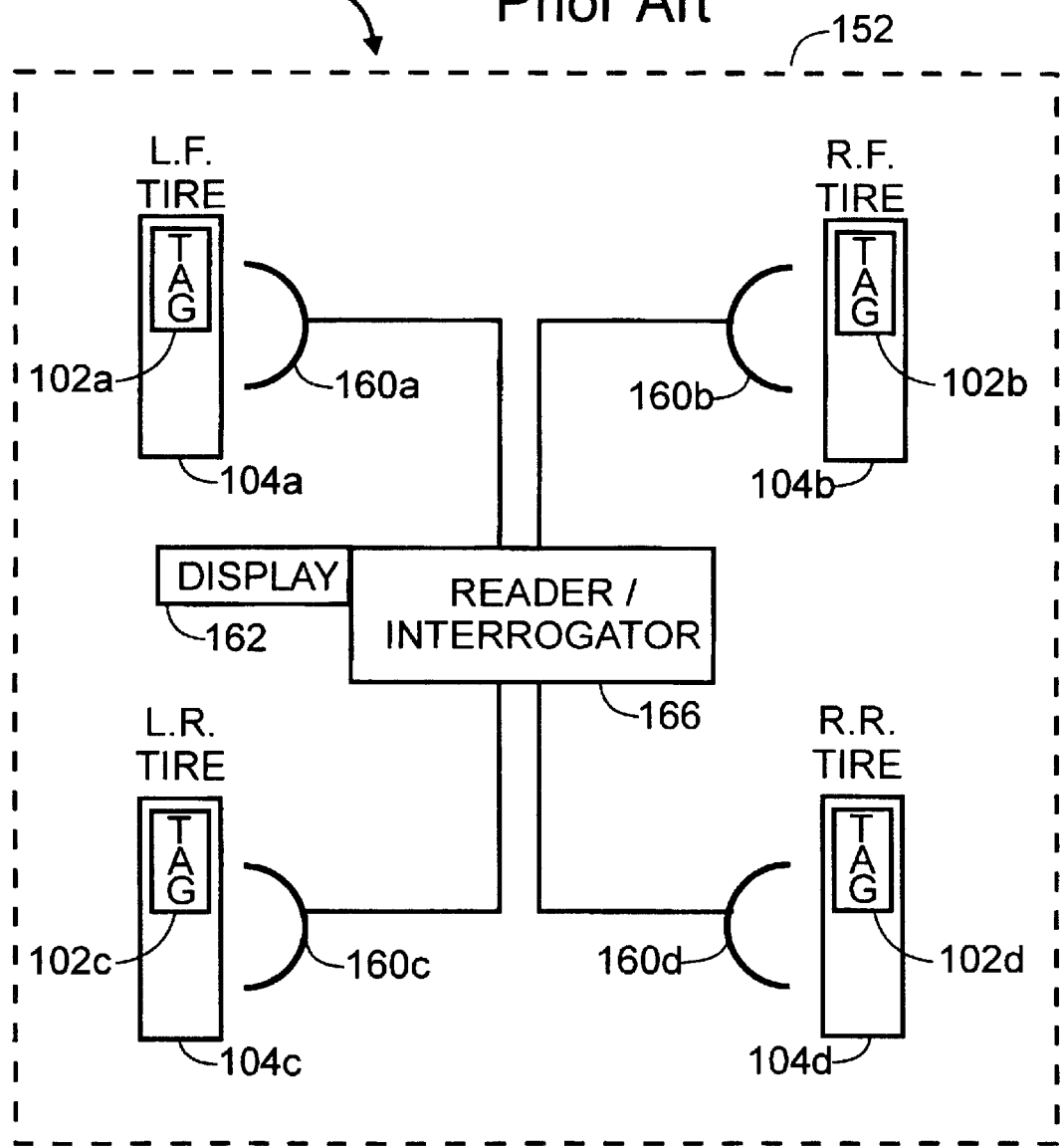
Figure 2:
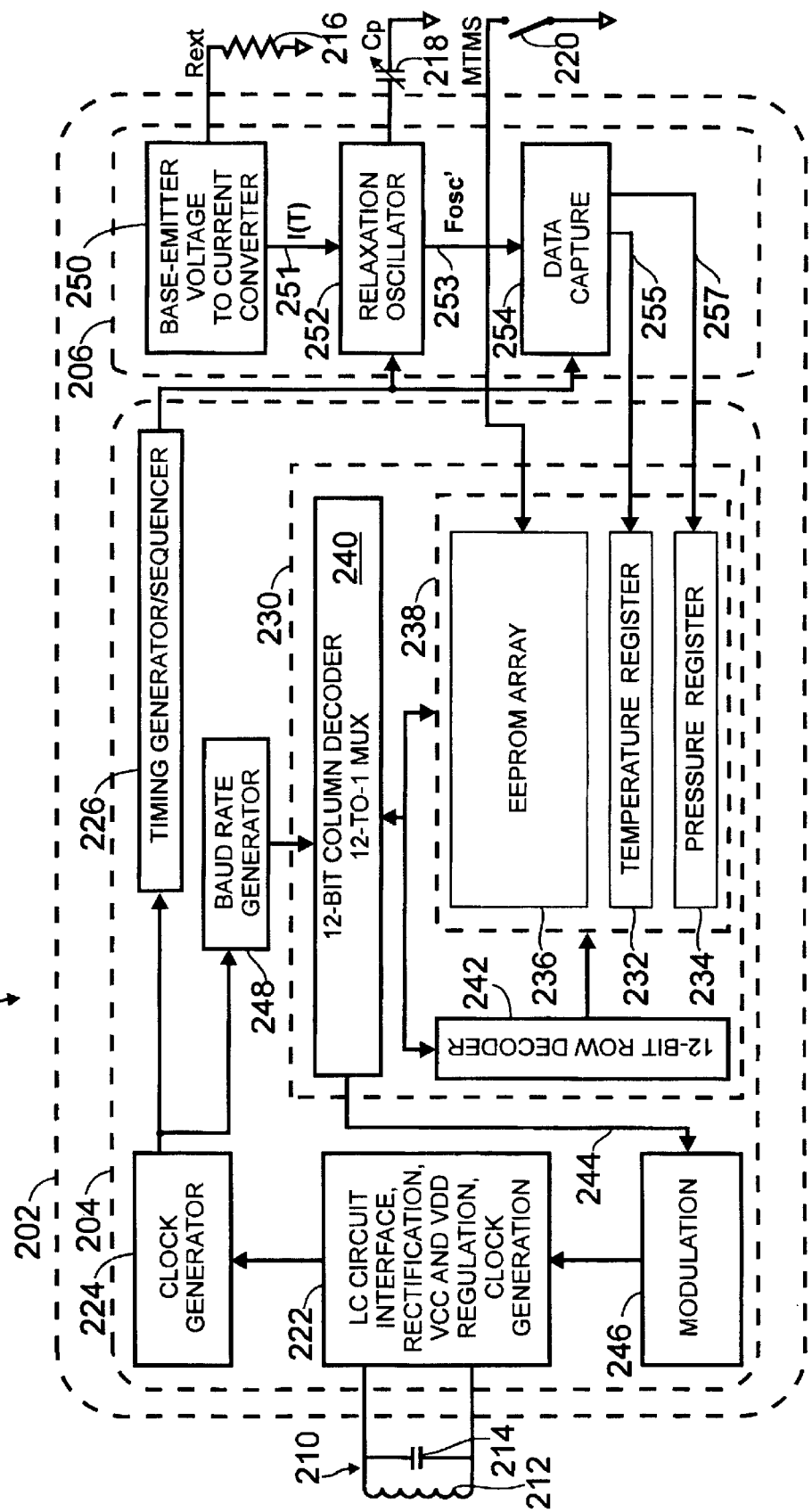
Figure 3:
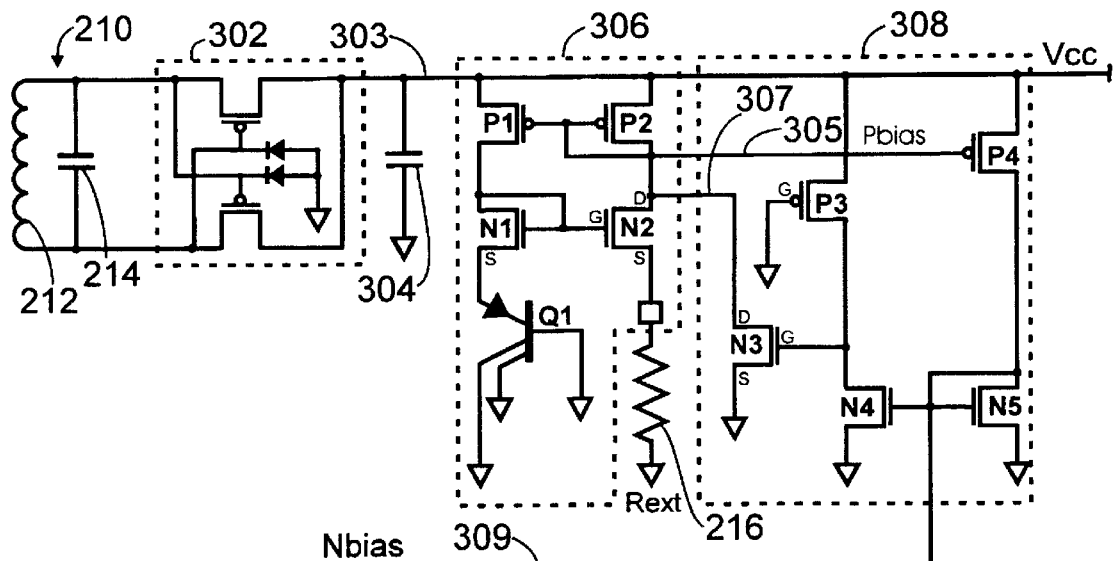
Figure 3:
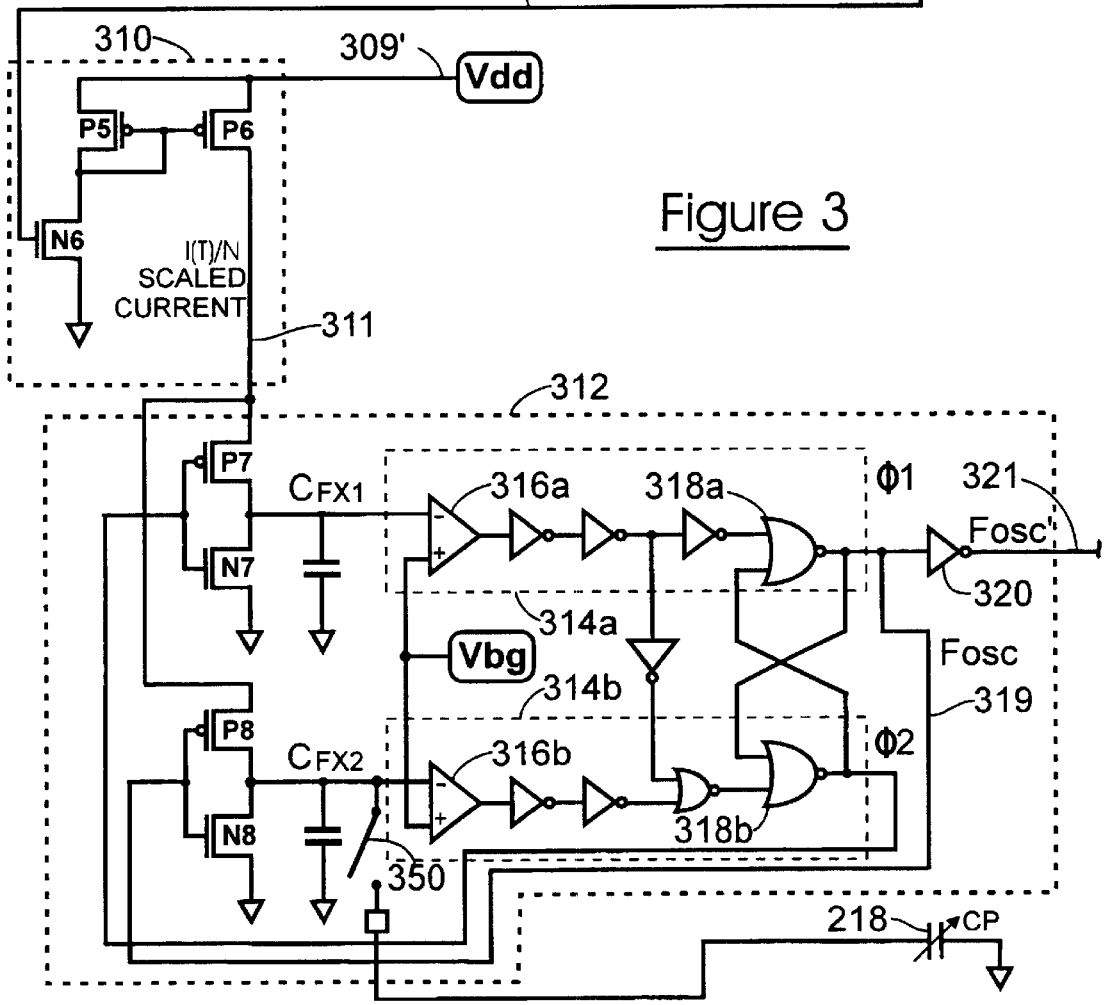
Figure 4:
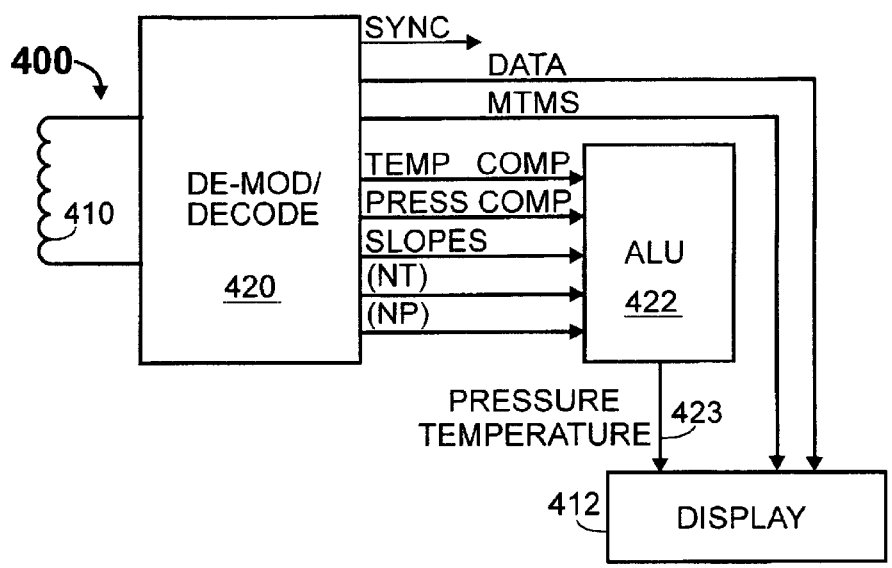
Figure 6C:
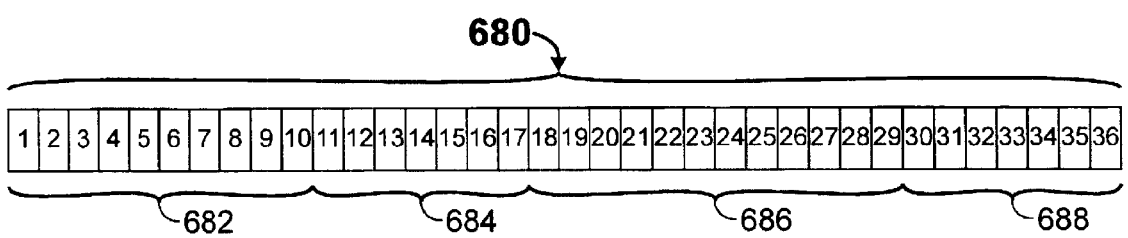
Figure 5A:
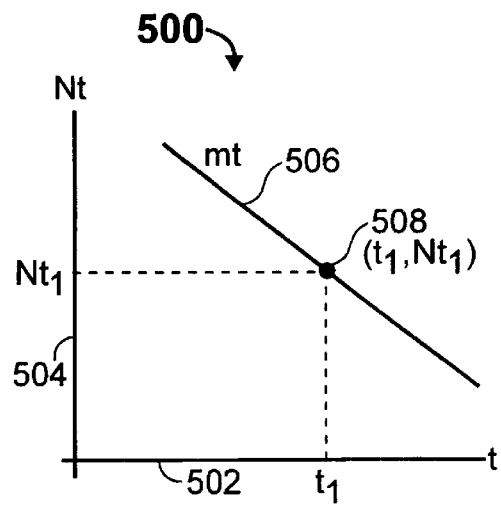
Figure 5B:
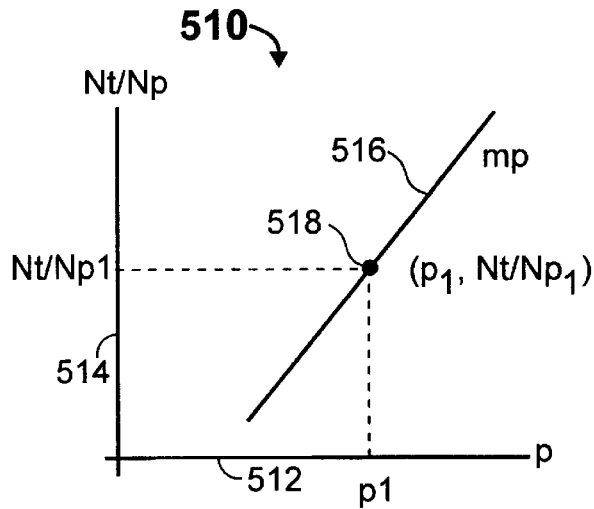
Figure 6A:
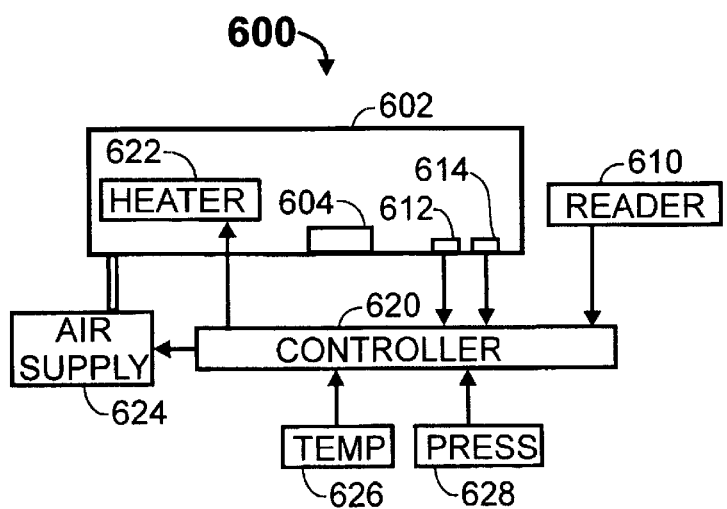
Figure 7:
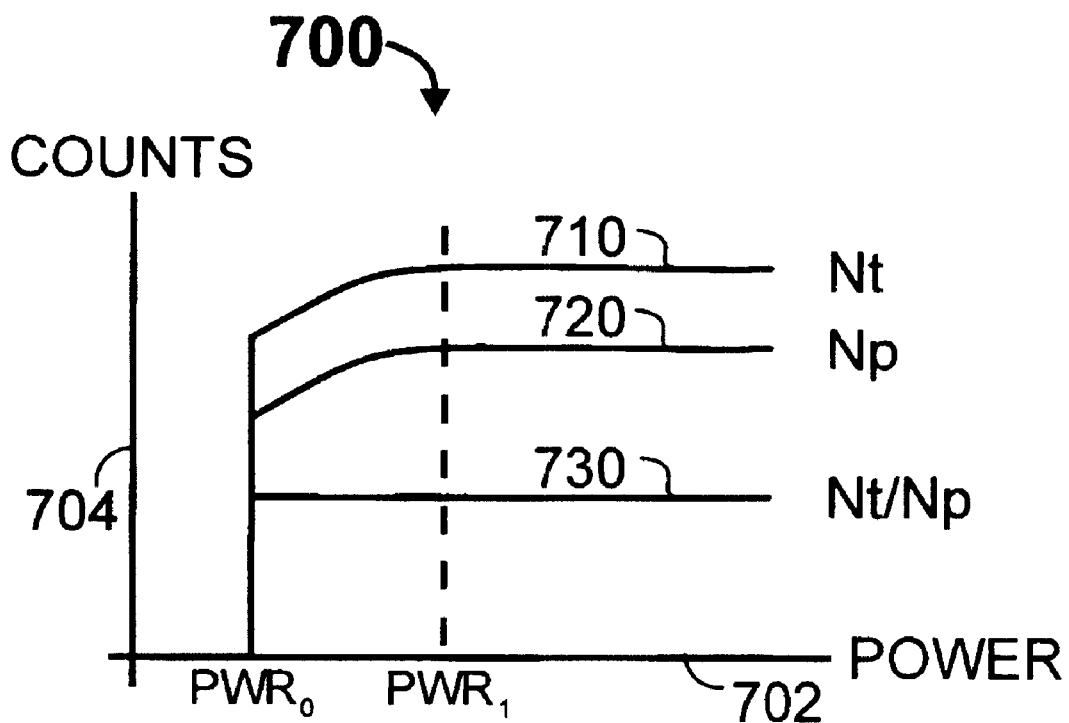

The structure, operation, and advantages of the present preferred embodiment of the invention will become further apparent upon consideration of the following description taken in conjunction with the accompanying drawings, wherein:

FIG. 1A is a generalized diagram of an RF transponder system comprising an external reader/interrogator and an RF transponder within a pneumatic tire, according to the prior art;

FIG. 1B is a schematic diagram of a typical tire pressure monitoring system (TPMS), according to the prior art;

FIG. 2 is a block diagram of major components of an RF transponder, according to the present invention;

FIG. 3 is a schematic diagram of major portions of the RF transponder of FIG. 2, according to the present invention;

FIG. 3A is a schematic diagram of a portion of the RF transponder of FIG. 2, according to the invention;

FIG. 3B is a schematic diagram of a portion of the RF transponder of FIG. 2, according to the invention;

FIG. 3C is a diagram of a memory space within the RF transponder of FIG. 2, illustrating how data may be arranged and transmitted, according to the invention;

FIG. 4 is a schematic block diagram of major portions of a reader/interrogator, according to the invention;

FIG. 5A is a graph of the temperature response of a transponder, according to the invention;

FIG. 5B is a graph of the pressure response of a transponder, according to the invention;

FIG. 6A is a block diagram of a transponder calibration system, according to the invention;

FIG. 6B is a flowchart of a transponder calibration procedure, according to the invention;

FIG. 6C is a bit map for a concatenated string of transponder calibration constants, according to the invention; and FIG. 7 is a graph of transponder readings as received by a reader/interrogator versus power supplied to a transponder, according to the invention.

DETAILED DESCRIPTION OF THE INVENTION

As mentioned hereinabove, it is an object of the present invention to provide a system for monitoring vehicle tire pressure and warning the driver when a low tire inflation pressure condition occurs.

FIG. 1A illustrates an RF transponder system 100 of the prior art, comprising an RF (radio frequency) transponder 102 disposed within (e.g., mounted to an inner surface of) a pneumatic tire 104. (An antenna, not shown, is mounted within the tire 104 and is connected to the transponder 102.) The transponder 102 is an electronic device, capable of transmitting an RIP signal comprising unique identification (ID) information (e.g., its own serial number, or an identifying number of the object with which it is associated—in this example, the tire 104) as well as data indicative of a parameter measurement such as ambient pressure sensed by a sensor (not shown) associated with the transponder 102 to an external reader/interrogator 106. The external reader/interrogator 106 provides an RF signal for interrogating the transponder 102, and includes a wand 108 having an antenna 110, a display panel 112 for displaying information transmitted by/from the transponder 102, and controls (switches, buttons, knobs, etc.) 114 for a user to manipulate the functions of the reader/interrogator 106. The present invention is directed primarily to implementing the RF transponder. Nevertheless, certain functionality for a reader/interrogator to be compatible with the transponder of the present invention is discussed hereinbelow with respect to FIGS. 4 to 7.

As is known, the ID and/or parameter measurement information may be encoded (impressed) in a variety of ways on the signal transmitted by the transponder 102 to the reader/interrogator 106, and subsequently "de-coded" (retrieved) in the reader/interrogator 106 for display to the user. The RF transponder 102 may be "passive", in that it is powered by an RF signal generated by the external reader/interrogator 106 and emitted by the antenna 108. Alternatively, the RF transponder 102 may be "active", in that it is battery-powered. Transponder systems such as the transponder system 100 described herein are well known.

AN EXEMPLARY VEHICLE SYSTEM

FIG. 1B illustrates a typical tire pressure monitoring system (TPMS) 150 of the prior art installed on a vehicle 152 (shown in dashed lines), such as a typical passenger vehicle having four pneumatic tires 104a, 104b, 104c and 104d (104) installed on four respective wheels (not shown).

Each of the four tires 104a . . . 104d (104) is equipped with an electronic module ("tag") 102a . . . 102d (102), respectively, and associated sensor (not shown, well known) capable of monitoring one or more conditions such as air pressure and/or air temperature within the tire, and transmitting a radio frequency (RF) signal indicative of (e.g., modulated as a function of) the monitored condition(s) within the respective vehicle tire. The tags 102 are suitably transponders, but may alternatively simply comprise one or more condition sensors and a radio frequency transmitter, as described hereinabove. Suitable tags 102 for use with the present invention are described in greater detail hereinbelow with respect to FIGS. 2 to 3C.

The system 150 comprises a single reader/interrogator 166 (compare 106) and an associated display unit 162 (compare 112). One or more antennas 160a . . . 160d (160, compare 110) may be disposed on the vehicle chassis to receive RF transmissions from the tags 102 and, optionally, to interrogate and/or power the tags 102. In this example of a prior art system, four antennas 160 are illustrated, each antenna being disposed at a fixed position on the vehicle adjacent a respective one of the tires 104, within the near field of the respective tag 102. As is known, the use of near field transmission has many distinct advantages over transmitting an inherently greater distance from each tire 104 to a centrally located antenna on the vehicle 152.

The use of an antenna 160 adjacent each wheel is entirely optional and is well known, for example, as disclosed in U.S. Pat. No. 3,553,060; U.S. Pat. No. 3,810,090; U.S. Pat. No. 4,220,907; U.S. Pat. No. 5,541,574; and U.S. Pat. No. 5,774,047, all of which are incorporated in their entirety by reference herein.

In this manner, monitored condition information carried by the RF signals from the respective tags 102 can be decoded (e.g., demodulated) for subsequent display (162) to the operator of the vehicle 152. It is within the scope of the invention that suitable discernable visual and/or audible warnings can be used at the option of the vehicle manufacturer.

The aforementioned TPMS 150 is presented merely as an example of an overall system installed on a vehicle, and should not be construed as limiting the present invention to a particular implementation, such as having an antenna at each of the wheel wells. Alternatively, for example, the TPMS 150 may employ a single antenna disposed in a suitable location to receive the transmissions of all of the tags 102.

FIG. 2 is a block diagram of the RF transponder 200 (compare 102) of the present invention, illustrating the major functional components thereof. This exemplary system is described as an embodiment which preferably measures pressure and temperature, but it is within the scope of the invention to include measurement of other parameters which employ suitable sensors.

The transponder 200 is preferably implemented on a single integrated circuit (IC) chip shown within the dashed line 202, to which are connected a number of external components. Other dashed lines in the figure indicate major functional "blocks" of the transponder 200, and include a transponder "core" 204 and a sensor interface 206. The components external to the IC chip 202 include an antenna system 210 comprising an antenna 212 and typically a capacitor 214 connected across the antenna 212 to form an L-C resonant tank circuit, an external precision resistor (Rext) 216, an external pressure-sensing capacitor ($C_P$) 218, and an optional external maximum temperature measurement switch (MTMS) 220. The antenna 212 may be in the form of a coil antenna, a loop antenna, a dipole antenna, and the like. Alternatively, the signal output by the transponder may be provided on a transmission line. For some of these antenna embodiments (e.g., a loop antenna), the capacitor 214 may be omitted since it would not be of benefit in tuning such an antenna system. In the main hereinafter, a transponder having a coil antenna is described.

The pressure-sensing capacitor $C_P$ is preferably a rugged, low temperature coefficient, sensor with a capacitance versus pressure response having good sensitivity and linearity in the pressure range of interest. An example is an all-silicon "touch mode" capacitive pressure sensor such as are known in the art, and mentioned hereinabove.

The transponder core 204 includes interface circuitry 222 for processing an RF signal, such as a 125 kHz (kiloHertz) un-modulated carrier signal received by the antenna 212, for rectifying the received RF signal, and for providing voltages for powering other circuits on the IC chip 202. For example, the interface circuitry provides a regulated supply voltage (Vdd) of 2.5 volts, and a temperature-independent bandgap voltage (Vbg) of 1.32 volts. The provision of various supply and reference voltages for the transponder circuitry are described in greater detail hereinbelow, with reference to FIG. 3B. The interface circuitry 222 also provides the received RF signal, preferably at the input frequency (Fi) it is received, to a clock generator circuit 224 which generates clock signals in a known manner for controlling the timing of other circuits on the IC chip 202, as well as the output frequency (Fc) of a signal which is transmitted by the transponder 200 to the external reader/interrogator (e.g., 106, 166).

A timing generator/sequencer circuit 226 receives the clock pulses from the clock generator circuit 224 and processes (e.g., divides) the clock pulses to generate timing windows ($W_T$ and $W_P$, described hereinbelow) for predetermined periods of time ($t_T$ and $t_P$, respectively) during which parameter (e.g., temperature and pressure) measurements are made. The timing windows $W_T$ and $W_P$ may either be of substantially equal duration or of unequal duration. The timing generator/sequencer circuit 226 also controls the timing and sequence of various functions (e.g., pressure measurement and capture, temperature measurement and capture, described in greater detail hereinbelow) performed in the sensor interface 206, and is preferably implemented as an algorithmic state machine (ASM).

The transponder core 204 further includes a register/counter circuit 230 which includes a temperature register 232 (e.g., 12-bit) and a pressure register 234 (e.g., 12-bit) for capturing and storing temperature and pressure measurements (counts), respectively, and a block 236 of addressable memory (e.g., 120-bit), which includes an EEPROM array. The registers 232 and 234 and EEPROM array 236 are shown in a dashed line 238 representing a block of addressable memory on the IC chip 202.

The register/counter circuit 230 also includes a multiplexer and column decoder 240, as well as a row decoder 242 for controlling the sequence in which signals (i.e., data) are output on a line 244 to a modulation circuit 246 which, via the interface circuitry 222, communicates selected measured tire operating characteristics in a data stream via the antenna system 210 to an external reader/interrogator (e.g., 106, 166).

The transponder core 204 also includes a baud rate generator 248 which controls the rate at which modulating information (e.g., the temperature or pressure measurement) is applied to the modulation circuit 246. The baud rate generator 248 also provides a data carrier clock controlling the output frequency Fc of the transponder and a data rate clock controlling a rate at which the data stream including measurements, calibration information, identification, etc. is modulated onto the transponder 200 output carrier signal.

The sensor interface 206 includes a circuit 250 for generating an output current I(T)/N on a line 251 which is related to a predictable characteristic voltage of a temperature-sensitive component (e.g., Vbe of a transistor Q1, described hereinbelow) which is superimposed on the external resistor (Rext) 216. The output current I(T)/N on the line 251 is provided to a relaxation oscillator 252. In general terms, the relaxation oscillator 252 oscillates at a frequency controlled by a rate of voltage change (dV/dT) which is a function of the output current I(T)/N on line 251 and of internal capacitances $C_{FX1}$, $C_{FX2}$ associated with the relaxation oscillator 252 as well as an external capacitance ($C_P$) 218 that can be switched into the oscillator circuit. An output signal Fosc' from the relaxation oscillator 252 is provided on a line 253 which, as will be explained in greater detail hereinbelow, is indicative of both ambient temperature and ambient pressure. As used herein, the term "ambient" refers to the parameter being measured in the vicinity of the transponder 200, or more particularly in the vicinity of the respective sensors associated with the transponder 200. When the transponder 200, 102 is mounted within a pneumatic tire (e.g., 104), "ambient pressure" and "ambient temperature" refer to the pressure and temperature of the inflation medium (e.g., air) within the tire 104.

In operation, an RF signal from an external source (i.e., reader/interrogator, not shown, compare 106, 166) is received by the antenna 212. This RF signal is rectified and used to power the RF transponder 200. Modulating information applied to the modulation circuit 246 is used to alter characteristics of the antenna system 210 (e.g., impedance, resonant frequency, etc.). These alterations are sensed by the external reader/interrogator 106, 166 and are decoded, providing communication of temperature and pressure information back from the RF transponder 200 to the external reader/interrogator 106, 166.

The timing generator/sequencer circuit 226 controls when the external pressure-sensing capacitance ($C_P$) 218 is included in the generation of a signal at frequency Fosc' which is output by the relaxation oscillator 252, and also controls the capturing of the pressure and temperature counts via the data capture circuit 254. For example, to measure temperature, the temperature-sensitive current I(T) passes through the internal oscillator capacitors ($C_{FX1}$ and $C_{FX2}$) but the pressure-sensing capacitor ($C_P$) 218 is disconnected from (not included in) those capacitances. This means that the frequency Fosc' of the oscillator output signal seen on line 253 is a function of temperature alone. When the pressure-sensing capacitor ($C_P$) 218 is "switched in", then the output frequency Fosc' of the oscillator 252 on the line 253 will, as explained in greater detail hereinbelow, be a function of both pressure and temperature. As described in greater detail hereinbelow, an algorithm is employed in the reader/interrogator 106, 166 to extract a "pressure-only" reading from the pressure-temperature measurement.

It should be noted that references made herein to "pressure readings", "pressure counts", "pressure response", "pressure register" and the like generally refer to "pressure" as measured by this transponder technique which actually produces a hybrid pressure-temperature reading. When this hybrid reading has been processed to remove its temperature component, the reading will be referred to as a "pressure-only" reading.

As controlled by the timing generator/sequencer circuit 226, the data capture circuit 254 directs the relaxation oscillator output signal Fosc' either to the temperature register 232 via line 255 or to the pressure register 234 via line 257, depending upon whether temperature or pressure is being measured. Counters convert the oscillator frequency Fosc' into counts which are stored in the registers 232, 234. The timing "window" provided by the timing generator/sequencer circuit 226 has a known, controlled duration. As a result, the count remaining in (captured by) the respective temperature or pressure register (232, 234 respectively) when the timing window "closes" is a function of (proportional to) the oscillation frequency Fosc' of the relaxation oscillator 252, and therefore a function of temperature or pressure, whichever is being measured during that timing window.

The EEPROM array 236 is used to hold calibration constants that the reader/interrogator (e.g., 106, 166) uses to convert temperature and pressure counts ($N_T$ and $N_P$, respectively, described in greater detail hereinbelow) into temperature and pressure readings which can be displayed (e.g., via display 112, 162) to a user. The EEPROM array 236 can also store the ID of the transponder, calibration data for the transponder, and other data particular to the given transponder.

FIG. 3 is a more-detailed schematic diagram 300 of several of the components of the transponder 200 of FIG. 2, primarily those components described hereinabove with respect to the sensor interface section 206 of FIG. 2.

In this schematic diagram 300, conventional circuit symbols are employed. For example, lines which cross over one another are not connected to one another, unless there is a "dot" at their junction (cross-over), in which case the lines are connected with one another. Conventional symbols are employed for transistors, diodes, ground connections, resistors, capacitors, switches, comparators, inverters, and logic gates (e.g., "AND", "NAND", "OR", "NOR").

The circuit is described in terms of a CMOS embodiment, wherein "P" followed by a number (e.g., "P1") indicates a PMOS (P-channel) transistor and "N" followed by a number (e.g., "N1") indicates an NMOS (N-channel) transistor. CMOS transistors are of the FET (field effect transistor) type, each having three "nodes" or "terminals"—namely, a "source" (S), a "drain" (D), and a "gate" (G) controlling the flow of current between the source and the drain. In the description that follows, it will be evident that a number of the PMOS and NMOS transistors are "diode-connected", meaning that their drain (D) is connected to their gate (G). The general theory of operation of transistors, particularly CMOS transistors, is well-known to those having ordinary skill in the art to which the present invention most nearly pertains.

As will be evident from the description that follows, a number of the CMOS transistors are connected in a "current-mirroring" configuration. The concept of current-mirroring is well known, and in its simplest form comprises two similar polarity transistors (e.g., two PMOS transistors) having their gates connected with one another, and one of the pair of transistors being diode-connected. Current-mirroring generally involves causing a current to flow through the diode-connected transistor, which results in a gate voltage on the diode-connected transistor required to produce that current. Generally, the gate voltage of the diode-connected transistor is forced to become whatever voltage is necessary to produce the mirrored current through that transistor. Since the diode-connected transistor, by definition, has no gate current, by applying the gate voltage of the diode-connected transistor to any other identically-connected transistor, a mirrored-current will flow through the identically-connected transistor. Typically, the current-mirroring transistors all have the same physical area, in which case the mirrored current will be essentially the same as the current which is being mirrored. It is also known to produce a mirrored current which is either greater than or less than the current being mirrored by making one of the transistors physically larger or smaller (in area) than the other. When such identically-connected transistors having different areas are connected in a current-mirroring configuration, their scaled (larger or smaller) areas will produce correspondingly scaled (larger or smaller) currents.

In the main hereinafter, the numerous connections between the various components of the circuit are clearly illustrated in the figure, and the descriptive emphasis is on the various functions of and interactions between the various components of the circuit rather than on reciting (ad nauseam) each and every individual connection between the various components, all of which are explicitly illustrated in the figure.

The antenna system 210 comprises a coil antenna 212 and an optional capacitor 214 (connected across the antenna 212 to form an L-C resonant tank circuit) providing an alternating current (AC) output to a full-wave rectifier circuit 302.

The full-wave rectifier circuit 302 (compare 222) comprises two PMOS transistors and two diodes, connected in a conventional manner, as shown, and outputs a full wave rectified direct current (DC) voltage on a line 303. A capacitor 304 is connected between the line 303 and ground to "smooth out" (filter) variations "ripple") in the full wave rectified DC voltage on the line 303. The voltage on the line 303 thus becomes a usable voltage for the remaining components of the transponder—in this case, a positive supply voltage Vcc on the line 303.

A temperature-sensing circuit 306, corresponding approximately to the base-emitter voltage-to-current converter 250 of FIG. 2, is connected between the line 303 (Vcc) and ground, and includes four CMOS transistors labeled P1, P2, N1 and N2 and a lateral bipolar transistor labeled Q1, and is connected to the external resistor 216 (Rext). The transistors P2 and N1 are diode-connected, as illustrated. The two transistors P1 and P2 are connected in a current-mirroring configuration, and the two transistors N1 and N2 are also connected in what can generally be considered to be a current-mirroring configuration. The source (S) of the transistor N1 is connected via the transistor Q1 to ground, and the source of the transistor N2 is connected via the external resistor (Rext) 216 to ground.

As will become evident, the ability of the temperature-sensing circuit 306 to produce a signal (i.e., a current) that is proportional to a sensed ambient temperature (e.g., within the tire with which the transponder is associated) is largely dependent on the characteristic that the base-emitter voltage of the transistor Q1 is a highly predictable and repeatable function of temperature. The resistor (Rext) 216 is an external, precision, reference resistor, whose value is substantially independent of temperature (as contrasted with the temperature dependency of the transistor Q1). A suitable value for the resistor (Rext) 216 is, for example, 20.5 kilohms or 455 kilohms.

The transistor N2 is connected between the transistor P2 and the external resistor 216 (Rext) in a "source-follower" mode. As a voltage is impressed on the gate (G) of the transistor N2, its source voltage will "follow" its gate voltage (minus an inherent voltage drop (Vgs) between its gate and its source).

As current flows through the transistor N1, its gate voltage will be offset by its gate-source voltage drop (Vgs) above the emitter voltage at the transistor Q1. Since the transistors N1 and N2 are essentially identical, with the same current flowing through each of the two transistors N1 and N2, they will have identical gate-source voltage drops (Vgs). As a result, the voltage at the source of the transistor N2 across the external resistor 216 (Rext) will be essentially identical to the voltage at the emitter of the transistor Q1. Hence, applying Ohm's law (E=IR, or I=E/R), the current through the external resistor 216 (Rext) will equal the emitter voltage of the transistor Q1 divided by the resistance of the external resistor 216 (Rext).

In normal operation, all of the current flowing through the external resistor (Rext) 216 flows through the source of the transistor N2 and, consequently, through the diode-connected transistor P2. By a current-mirroring connection, the current through the transistor P2 is replicated (mirrored) in the transistor P1. This ensures that the current flowing through the transistors N1 and N2 will be the same, at all times, which further helps to ensure that the emitter voltage at the transistor Q1 and the voltage across the external resistor (Rext) 216 are identical, independent of voltage and process variations. As mentioned hereinabove, the transistors N1 and N2 are connected in what can generally be considered to be a current-mirroring configuration. However, since they are not strictly identically connected, their function in the circuit 306 is principally for "matching" Q1 and Rext.

In essence, the circuit 306 ensures that the current I(T) flowing through the external resistor (Rext) is predictable, and is a function of the absolute temperature (T) of the transistor Q1. As described in greater detail hereinbelow, this temperature-dependent current I(T) flowing through the external resistor (Rext) 216 is mirrored to a relaxation oscillator (312, described hereinbelow) to provide a signal indicative of the temperature of the transistor Q1 to the external reader (106, FIG. 1). As described in greater detail hereinbelow, the output frequency Fosc' of the relaxation oscillator 312 will be a function of the absolute temperature (T) of the transistor Q1.

At this point, it is useful to note that it is essentially the transistor Q1 that is being employed as the temperature-sensing element of the overall transponder circuit. The transponder circuit advantageously employs an inherent characteristic of such a transistor implemented in CMOS technology that the base-emitter voltage of the transistor Q1 will vary by a predictable amount of −2.2 mv/° C. (millivolts per degree Celsius).

It should be noted that the transponder of the present invention is described in terms of a "passive" device, relying on RF energy being supplied to it by an external source (106, FIG. 1) to power up its circuitry. However, it is within the scope of this invention that the transponder contains its own power supply, such as in the form of a battery. In either case, when first powering up circuitry such as described with respect to the temperature-sensing circuit 306, it is important to ensure that they "ramp up" to their normal operating state from their quiescent state in a reliable and predictable (controlled) manner. To this end, two lines 305 and 307 are illustrated which are connected between the temperature-sensing circuit 306 and a "startup" circuit 308.

The startup circuit 308 (also part of the base-emitter voltage-to-current converter 250 of FIG. 2) is connected between the supply voltage (Vcc) on the line 303 and ground, and serves two main purposes: (i) to get current flowing in the temperature-sensing circuit 306 when the transponder (200) first starts up from a powered down state; and (ii) to mirror and convert the current flowing through the transistor P2 from a supply-referenced current to a ground-referenced current.

Startup is initiated by the transistor P3. The transistor P3 is fabricated to have high channel resistance so as to function in a "weak pull-up" mode. With its gate connected to ground, it will always be "on", and will behave essentially like a resistor having a fairly high resistance (e.g., >1 megohm).

Since, at startup, no current flows elsewhere in the circuit, the transistor 13 operates to pull the gate of the transistor N3 towards the supply voltage (Vcc), thereby tuning the transistor N3 "on", which effectively connects the grounded source of transistor N3 to its drain (D) which, in turn, grounds the gates of transistors P1, P2, and P4, and also grounds the drain of diode-connected transistor P2. This causes current to flow through the transistor P2 of the temperature-sensing circuit 306 into the drain of the transistor N3. Since the transistors P1, P2 and P4 are current-mirror connected (via the "Pbias" line 305), the current now flowing through transistor P2 will be mirrored in the transistors P1 and P4. As current flows through the transistor P4 into the diode-connected transistor NS, a current-mirroring connection between the transistors N4 and N5 causes a corresponding current to flow through the transistor N4, thereby pulling the gate of transistor N3 to ground, thereby effectively shutting "off" the flow of current through the transistor N3.

However, with current now flowing through the current-mirrored transistors P1, P2 and P4, current flowing from the transistor P1 through the diode-connected transistor N1 into the transistor Q1 forces the temperature-sensing circuit 306 to "start up" in its stable operating point state (rather than its zero current state). After startup, the transistor N3 essentially "drops out" of the circuit, having performed its intended function.

The transistor N5 is connected in a current-mirroring configuration with the transistor N4 (and, as described hereinbelow, with the transistor N6). Therefore, essentially, with a current equivalent to the current through the external resistor (Rext) 216 flowing through the transistor N5, the same current flows through the transistor N4, thereby establishing a reference voltage (Nbias) on the line 309. The reference voltage (Nbias) on the line 309, as well as a supply voltage (Vdd) on a line 309', are provided to a current scaling circuit 310.

The supply voltage (Vdd) on the line 309' is provided in any suitable manner, such as a multiple of a bandgap voltage (Vbg) generated in a conventional manner elsewhere on the chip, and its magnitude (e.g., 1.32 volts) should be independent of temperature, such as inherent to the silicon process which is employed in making the chip. The provision of such a stable (e.g., bandgap) voltage (e.g., Vbg) and the supply voltage (e.g., Vdd) derived therefrom is well within the purview of one having ordinary skill in the art to which the present invention most nearly pertains, and is described in greater detail hereinbelow with respect to FIG. 3B.

The current scaling circuit 310 (also part of the base-emitter voltage-to-current converter 250 of FIG. 2) is constructed in the following exemplary manner. The sources of the transistors P5 and P6 are connected to supply voltage Vdd. The gate of a transistor N6 receives the reference voltage (Nbias) on the line 309. The transistor N6 is connected in a current-mirroring configuration with the transistor N5 (as well as with the aforementioned transistor N4) and will therefore mirror the flow of current I(T) through the transistors N4 and N5. Consequently, the flow of current through the diode-connected transistor P5 will mirror the flow of current through the transistors N4, N5 and N6.

The transistors P5 and P6 are connected in a current-mirroring configuration, but are fabricated (using conventional CMOS fabrication techniques) such that current flowing through the transistor P6 is scaled up or down by a ratio (N) of the physical area of the transistor P5 to the physical area of the transistor P6. For example, if the transistor P6 is smaller in size than the transistor P5 (i.e., the transistor P5 is "N" times larger in area than the transistor P6), then the current flowing through the transistor P6 will be commensurately (N times) smaller than the current flowing through the transistor P 5. Thus, the "scaled" current flowing through the transistor P6, is labeled "I(T)/N" in the figure, and is provided on a line 311 (compare 251) to a relaxation oscillator circuit 312 (compare 252). It is well known that the ratio of the currents between the transistors P5 and P6 can readily be established by conventional circuit processing techniques, such as by simply making one of the transistors larger than the other, or by implementing a one of the two transistors as the aggregate of two or more same-size transistors so that their aggregate area is larger than the area of the other of the two transistors.

The relaxation oscillator circuit 312 (compare 252) is of fairly conventional design, and includes two pair of transistors at the "front end" of each of its two phase paths—a pair of complementary transistors P7 and N7 at the front end of a one phase path (1) 314a, and another pair of complementary transistors P8 and N8 at the front end of another phase path (2) 314b.

Connected as illustrated, for a given pair of transistors (e.g., P7 and N7), when their common gate voltage is high (i.e., towards positive supply) their output (e.g., to phase path 314 a) will be grounded (connected to ground and isolated from current I(T)/N on line 311), and when their common gate voltage is low, their output will provide the current I(T)/N flowing on the line 311 to a respective one of the phase paths (e.g., 314 a) of the relaxation oscillator 312. As is known for circuitry such as the relaxation oscillator 312, when the common gate voltage of a one of the pairs of transistors (e.g., P7 and N7) is high, the common gate voltage of the other of the pairs of transistors (e.g., P8 and N8) will be low, and vice-versa. In this manner, each phase path 314a and 314b has a duty cycle (i.e., its "on" time), which may be the same as or may be different than the duty cycle of the other phase path 314b and 314a, respectively. Thus, each pair of transistors (e.g., P7 and N7) may be considered to be an "input switch" to its respective phase path (e.g., 314a).

Each phase path 314a and 314b of the relaxation oscillator 312 has a comparator 316a and 316b, respectively, at its input, and has a fixed-value capacitor $C_{FX1}$ and $C_{FX2}$, respectively, connected between the negative (−) input of the comparators 316a and 316b and ground. The capacitors $C_{FX1}$ and $C_{FX2}$ have exemplary capacitance values of 2–5 pf (picofarads) and 2–5 pf, respectively, and are preferably implemented as equal-valued "on-chip" devices, such as poly-to-poly capacitors exhibiting a low temperature coefficient (e.g., less than 20 ppm). The positive (+) inputs (terminals) of the comparators 316a and 316b are tied together and are set to a reference threshold voltage Vbg, such as 1.32 volts, which is independent of temperature.

A "NOR" logic gate 318a and 318b is connected at the output of each phase path 314a and 314b, respectively, and the two NOR gates 318a and 318b are cross-connected to form a latching circuit having an output on a line 319a and 319b. The cross-connected NOR gates 318a and 318b are thus capable of functioning as a flip flop, or an RS (re-set/set) latch.

When the common gate voltage of one of the input switches (e.g., N7 and N7) is high, the respective capacitor (e.g., $C_{FX1}$) for that phase path (e.g., 314a) is grounded (shorted out, caused to be devoid of charge). Conversely, when the common gate voltage of one of the input switches (e.g., P7 and N7) is low, the scaled current I(T)/N from line 311 is applied to (allowed to flow into) the respective capacitor (e.g., $C_{FX1}$) for that phase path (e.g., 314a), and the capacitor begins to charge (acquire an increasing voltage across the capacitor). When the voltage across the capacitor $C_{FX1}/C_{FX2}$ reaches the comparator reference voltage Vbg the output of the comparator 316a/316b goes low and changes the state of the output of the latch 318a/318b on the line 319a/319b. In this manner, the relaxation oscillator 312 will oscillate at a frequency Fosc determined by the rise time of the capacitors $C_{FX1}$ and $C_{FX2}$ and, importantly, by the scaled current I(T)/N being supplied to the capacitors $C_{FX1}$ and $C_{FX2}$. With greater current I(T)/N being supplied, the voltages of the capacitors $C_{FX1}$ and $C_{FX2}$ will rise faster, crossing the threshold voltage faster, and causing the relaxation oscillator 312 to oscillate faster, thereby increasing the frequency Fosc of the signal on the line 319a. The signal on the line 319a is inverted by an inverter 320, as shown, to provide a signal of frequency Fosc' on the line 321.

As described in greater detail hereinbelow, the oscillator 312 is controlled to run in two mutually-exclusive modes, a temperature-sensing mode (between times t0 and t1) and a pressure-sensing mode (between times t1 and t2), as controlled by the timing generator/sequencer 226. The frequency of the oscillator output signal Fosc (and Fosc') will be different in each of these two modes.

GENERATING TEMPERATURE AND PRESSURE READINGS

In the exemplary context of the transponder 200 being associated with a pneumatic tire, it is principally desirable to determine the pressure within the pneumatic tire. For example, a typical passenger vehicle tire may be properly inflated at about 32 psi (about 221 kPa). Since tire inflation pressures are normally specified as "cold" pressures (pressure measured when the tire is not heated by operation), and since a monitoring device will be reporting pressures measured in tires which are most likely in use and therefore "hot", it is secondarily desirable to determine the temperature of the inflation medium (e.g., air) within the pneumatic tire. Utilizing the temperature measurement, a monitoring system (e.g., TPMS 150) can, for example, convert the measured pressure to a "cold" pressure with simple calculations based on the ideal gas law (PV=$\mu$RT). This "cold" pressure could be considered a "temperature-independent" pressure, which is also an indication of the mass of air contained by the tire. With reference to the transponder 200 of this invention, the hybrid "pressure" measurement it produces must be converted (by different calculations detailed hereinbelow) to a true pressure-only measurement before it can be used in such gas-law calculations.

It is, for example, estimated that an approximate 10% decrease in fuel consumption could be realized if the pneumatic tires on vehicles were operated at their specified pressure. Although vehicle fleet operators are typically sensitive to this issue, and check and adjust tire pressure frequently, the average operator of a passenger vehicle is often less inclined to keep an eye on their tire pressure until, for example, the tire is visibly flattened out. In such cases, an LCD (liquid crystal display) readout or the like on the dashboard of a car could provide dynamic tire inflation information to the operator of a vehicle, the pneumatic tires of which are equipped with a transponder such as the one described herein. Of no less significance is the emergence of "run-flat" tires being marketed by various tire manufacturers. The Goodyear EMT (extended mobility technology) series of tires is an example of a "run-flat" tire, an overall purpose of which is to allow a driver to travel up to 50 miles (approximately 120 kilometers) on a deflated "flat") tire, at "reasonable" operating speeds (e.g., 60 miles per hour, or 144 kilometers per hour), while maintaining normal control over the vehicle. Such run-flat tires are generally well known, and do not form a portion of the present invention, per se. When running "flat" on a run-flat tire, it is particularly important that the driver be alerted to the fact that he or she is operating the vehicle on "borrowed time" as indicated, principally, by an indication, whether visual or audio (e.g., a beep) that the tire is indeed "flat" and needs to be repaired or replaced at his or her earliest convenience (and before the run-flat mileage limit).

By allowing the relaxation oscillator 312 to run, the frequency of its output signal Fosc (and Fosc') will be a function of the absolute temperature of (sensed by) the transistor Q1. This is true in both the temperature-sensing mode and the pressure-sensing mode of operation.

In the temperature-sensing mode, and in the case that the capacitance values for $C_{FX1}$ and $C_{FX2}$ are equal, which is preferred, the relaxation oscillator 312 will have a symmetrical (balanced, 50%) duty cycle. In the pressure-sensing mode, the pressure-sensing capacitor ($C_P$) 218 is switched by a semiconductor switch 350 across $C_{FX2}$, which changes the duty cycle and output frequency Fosc (and Fosc') of the relaxation oscillator 312.

In the temperature-sensing mode, only the fixed capacitors $C_{FX1}$ and $C_{FX2}$ are being alternately charged (and discharged) resulting in a 50% duty cycle with a period proportional to ambient temperature. In the pressure-sensing mode, the pressure-sensing capacitor ($C_P$) 218 is switched into phase path 314b of the oscillator 312. Thus, for a given temperature, for the first half of the oscillator period the phase path 314a behaves in the same manner as in the temperature-sensing mode, and for the second half of the oscillator period the phase path 314b behaves in a manner that is proportional to the capacitance value of the fixed capacitor $C_{FX2}$ plus the capacitance value of the pressure-sensing capacitor ($C_P$) 218. This, in effect, slows down the oscillator and changes its duty cycle. The change in the duty cycle is indicative of the ratio of $C_P$ to $C_{FX2}$. Thus, from the ratio of the two periods (with and without $C_P$ in the circuit, it is straightforward to calculate what the additional capacitance $C_P$ is, hence the sensed pressure. As described in greater detail hereinbelow, the temperature-dependency of the oscillator output in the pressure-sensing mode can be completely eliminated, in a straightforward manner.

The "slowing down" of the oscillator when the pressure-sensing capacitor ($C_P$) 218 is switched into the oscillator circuit results, inevitably, in there being relatively fewer oscillator output pulses (reduced output frequency) to count during a given pressure-measurement window (e.g., $W_P$) than during a similar duration temperature-measurement window (e.g., $W_T$). In other words, a "slowed-down" oscillator will reduce that rate at which counts indicative of the parameter measurement are collected. In order to increase the resolution (quantity) of the counts ($N_P$) generated during the pressure-measurement window ($W_P$), it is contemplated that the pressure-measurement window ($W_P$) can be increased in size (changed in duration) so as to allow for the capture of an appropriate number of pressure counts in the pressure register 234. This can readily be accomplished simply by establishing a larger (than otherwise) value for the time t2 which establishes the end of the pressure-measurement window ($W_P$) in the pressure-sensing mode (between times t1 and t2), as controlled by the timing generator/sequencer 226. For example, the temperature-measurement window $W_T$ (between times t0 and t1) can be on the order of several ones (e.g., eight) of milliseconds, and the pressure-measurement window $W_P$ can be on the order of tens or dozens (e.g., eighty) of milliseconds. Alternatively, it is contemplated that the scaled current (I(T)/N) flowing out of the current scaling circuit 310 to the relaxation oscillator 312 could be increased during the pressure-measurement window ($W_P$) to increase the fundamental frequency of the relaxation oscillator 312, thereby increasing the overall resolution of the pressure count. This can readily be accomplished, for example in the case of transistor P6 being smaller in size (area) than the transistor P5, simply by switching in a transistor P6' (not shown) in lieu of the transistor P6, the transistor P6' having a larger area than the transistor P6 so that the ratio of the areas of the transistors P5 and P6 is closer to unity (i.e., less scaled down) and the current to the relaxation oscillator 312, hence its counting rate, is increased. Such switching in of another transistor P6' is readily effected with a switch (not shown) comparable to the aforementioned switch 350 which switches in the pressure-sensing capacitor ($C_P$) 218. One having ordinary skill in the art to which the present invention most nearly pertains will readily understand how to offset the "slowing down" of the oscillator when the pressure-sensing capacitor ($C_P$) 218 is switched into the oscillator circuit, in light of the teachings presented herein.

OPTIMIZING PRESSURE-RESPONSIVENESS

Obtaining (and displaying) an accurate pressure reading being of paramount importance when monitoring the pressure of a pneumatic tire, certain parameters of the transponder circuit may be established to maximize its pressure-responsiveness and therefore improve the accuracy of the pressure reading displayed by the external reader/interrogator (e.g., 106, 166).

As described hereinabove, the transponder responds to the changing capacitance of the pressure sensor ($C_P$) 218 by changing the value of a binary 12-bit word that is transmitted to the external reader/interrogator 106, 166. This binary word is the count of an oscillator frequency during a timing window $W_P$ (between t1 and t2) established by the timing generator/sequencer 226. The pressure response can therefore be described as the change in counts per unit change in capacitance of the pressure-sensing capacitor ($C_P$) 218.

Pressure-responsiveness (and resolution) of the transponder has been found to be dependent on a number of factors, each of which can be analyzed. For example, it has been determined that:

(a) Increasing the pressure-measurement window $W_p$ to make it larger than the temperature-measurement window $W_t$ will increase the pressure count $N_p$ (and not the temperature count $N_T$) for a given value of the pressure-sensing capacitor ($C_P$) 218, to make up for the relatively lower oscillator frequency which occurs during pressure measurement compared to temperature measurement (as detailed hereinabove).

(b) Increasing the scaled current I(T)/N to the oscillator 312 will proportionally increase the pressure count $N_P$ for a given value of the pressure-sensing capacitor ($C_P$) 218.

(c) Decreasing the values for capacitor(s) $C_{FX1}$ and/or $C_{FX2}$ will proportionally increase the pressure count $N_P$ for a given value of the pressure-sensing capacitor ($C_P$) 218.

(d) Increasing the scaled current I(T)/N to the oscillator will proportionally increase the pressure count $N_P$ (for a given value of $C_P$) at a greater rate than decreasing the values for capacitors $C_{FX1}$ and $C_{FX2}$.

(e) Increasing the scaled current I(T)/N will increase both the pressure counts $N_P$ and the temperature counts $N_T$ unless the current increase can be made to occur only during the pressure-measurement window $W_p$.

(f) Decreasing the values for capacitor(s) $C_{FX1}$ and/or $C_{FX2}$ will increase both the pressure counts $N_P$ and the temperature counts $N_T$ even if only one of the capacitors is changed.

As a general proposition, increasing the pressure counts $N_P$ is desirable. However, one having ordinary skill in the art to which the present invention most nearly pertains will readily appreciate that there is a practical upper limit to increasing the pressure counts at a frequency which may become unacceptably large for the capability of certain circuits of the IC chip.

MEASURING PARAMETERS

FIG. 3A illustrates the components involved in the final step of capturing temperature and pressure measurements in the transponder. The signal Fosc' output by the relaxation oscillator 312 is provided on line 321 (compare 253) to an input of each of two AND gates 360 and 362 in the data capture circuit 254. A signal "Capture Temp") is provided by the timing generator/sequencer 226 to the other input of the AND gate 360 during the temperature-sensing window ($W_T$) so as to load the temperature register 232 via line 255 with the count "data," or "reading") $N_T$ indicative of measured temperature. Another data signal "Capture Press") is provided by the timing generator/sequencer 226 to the other input of the AND gate 362 during the pressure-sensing window ($W_P$) so as to load the pressure register 234 with the count "data," or "reading") $N_P$ indicative of measured pressure. Each of the registers 232, 234 has a counter (not shown) associated with it to convert the incoming oscillating signal Fosc' to a stored count. The two counts $N_T$, $N_P$ are then shifted out of the registers 232 and 234, via the MUX 240, to the modulation circuit 246 described hereinabove.

When the transponder is powered up, temperature and pressure are continuously measured, and these measurements are transmitted back to the external reader/interrogator 106, 166 as data words in a data stream. For example, each of the temperature and pressure parameters can be transmitted back to the reader/interrogator 106, 166 as 12-bit data words in selected (known) portions of a larger (e.g., 144-bit) data stream. One bit in the overall data stream may be dedicated to the state (e.g., "closed" or "open") of the MTMS switch 220. A complete description of an exemplary data stream being transmitted by the trasnponder to the external reader/interrogator is set forth hereinbelow with reference to FIG. 3C.

Temperature is suitably measured by counting the number of cycles output from the oscillator 312 during a fixed time period (window $W_T$ of time from t0 to t1) having a time period $t_T$. For example, a down-counter (not shown, but associated with the temperature register 232) may be clocked by the oscillator, such that at the end of the window $W_T$ time period $t_T$, a temperature count $N_T$ is generated. The relationship between temperature count $N_T$ and temperature is substantially linear for the circuitry 300 of this embodiment.

Similarly, pressure can be measured by counting the number of cycles output from the oscillator 312 during a fixed time period (window $W_P$ of time from t1 to t2) having a time period $t_P$. For example, a down-counter (not shown, but associated with the pressure register 234) may be clocked by the oscillator, such that at the end of the window $W_P$ time period $t_P$, a temperature count $N_P$ is generated. The relationship between pressure count $N_P$ and pressure is a predictable function of both actual pressure and temperature for the circuitry 300 of this embodiment. As explained hereinbelow, by manipulating the temperature and "pressure" counts ($N_T$ and $N_P$) this hybrid pressure-temperature value can be used to determine a pressure-only value.

OBTAINING A PRESSURE-ONLY READING AT THE READER/INTERROGATOR

The fundamental frequency of the oscillator 312 is set by parameters in the IC chip (e.g., 202) and, as described hereinabove, is temperature-dependent. Therefore, the pressure response $N_P$ is a function (hybrid) of both temperature and pressure, and the relationship of $N_P$ to $C_P$ is nonlinear. Therefore, using a linear equation for calculating the pressure response would inevitably lead to significant errors over a range of pressures being measured. However, for limited ranges of pressures being measured, for example over a 20 psi (138 kPa) range of pressures, using a linear equation may be acceptable. A better approximation might be obtained using a polynomial equation, but this would complicate the reader/interrogator logic, making for slower response, and would require additional calibration constants.

An important advantage of using the transponder circuitry described hereinabove is that the relationship of $N_T/N_P$ to pressure sensor capacitance $C_P$ is linear, and requires no temperature compensation term in the equation (algorithm) used by the reader/interrogator 106, 166 to calculate pressure, thereby greatly simplifying the design of the reader/interrogator. (This also assumes the use of a pressure sensor ($C_P$) 218 which has a substantially linear relationship between pressure and capacitance.) This beneficial "ratiometric" relationship is readily demonstrated by the following equations:

Generally, count=counting window time $(t)$*frequency $(F)$ $F$=1/period

Charging time=$V$*$C$/$I$ for a capacitor with capacitance C to be charged to a voltage V with a current I.

Since the period of the relaxation oscillator 312 with output signal of frequency Fosc' is the sum of the charging times for the capacitances in the two phase paths 314$a$ and 314$b$, the above equations can be manipulated to obtain a general equation for the count from such a relaxation oscillator with capacitances $C_{FX1}$ and $C_{FX2}$, for example:

count=$t/(V*C_{FX1}/I+V*C_{FX2}/I)=t*I/(V*(C_{FX1}+C_{FX2}))$

Substituting the values for the temperature and pressure counts:

$N_T=(t_T*I(t)/n_T)/(Vbg*(C_{FX1}+C_{FX2}))$     [EQ. A]

$N_P=(t_P*I(T)/n_P)/(Vbg*(C_{FX1}+C_{FX2}+C_P))$ where $n_T$ and $n_P$ are values for the scaling factor N in the scaled current I(T)/N which could be different during the temperature and pressure measurement windows, respectively.

Dividing equations to obtain $N_T/N_P$:

$N_T/N_P=(t_T/t_P)*(n_P/n_T)*(C_{FX1}+C_{FX2}+C_P)/(C_{FX1}+C_{FX2})$ or $N_T/N_P=(t_T/t_P)*(n_P/n_T)*(1+(C_P/(C_{FX1}+C_{FX2})))$     [EQ. B]

Since everything to the right of the equals sign is a defined constant except for the pressure-sensing capacitance $C_P$, it can be seen that there is a linear relationship between $N_T/N_P$ and $C_P$ (and thus pressure). This means that $N_T/N_P$ is only a function of pressure, and is insensitive to temperature or capacitor-charging current variations.

If none of the response optimization steps described hereinabove have been utilized, then the equation EQ. B can be simplified since capacitors $C_{FX1}$ and $C_{FX2}$ have the same value $C_{FX}$; the measurement windows $W_T$ and $W_P$ have the same time width $t_T=t_P=t_W$ (e.g., 8.192 ms); and the current scaling factors $n_T$ and $n_P$ have the same value N:

$N_T/N_P=1+(C_P/2*C_{FX})$

It can be seen from equation EQ. A that there is already a linear relationship between the temperature count $N_T$ and the current I(T) (which is, in turn, proportional to temperature).

In both of the measurement equations EQ. A and EQ. B it can be seen that linear relationships exist, but the slope and intercept of these equations are complex combinations of multiple parameters which are unique to a given transponder design, and are likely to be different even for each transponder of a given design due to manufacturing variances. In a simple embodiment of this invention, the transponder could transmit only the counts $N_T$ and $N_P$ to a reader/interrogator, and the reader/interrogator would have to use assumed average values for slope and intercept in order to determine temperature and pressure. This could cause significant inaccuracy, so the preferred embodiment as described herein stores calibration constants in the transponder memory (e.g., 236) and transmits these calibration constants with the measurement counts $N_T$ and $N_P$ so that the reader/interrogator (e.g., 106, 166) can accurately calculate temperature and pressure using equations customized/optimized for the individual transponder generating the measurements. The calibration process will be described hereinbelow.

GENERATING RELIABLE SUPPLY AND REFERENCE VOLTAGES

As described hereinabove, the positive (+) inputs (terminals) of the comparators 316a and 316b are tied together and are set to a reference "bandgap" voltage Vbg, such as 1.32 volts, which is independent of temperature. As also mentioned hereinabove, the supply voltage (Vdd) on the line 309' may be provided as a multiple of the reference bandgap voltage (Vbg) so as to be a stable operating voltage for the current scaling circuit 310 and the relaxation oscillator 312.

FIG. 3B illustrates a circuit 370 suitable for generating the supply voltage Vdd. A temperature-independent calculable bandgap voltage Vbg is readily derived, based on the processing techniques employed in fabricating the IC chip, as being inherent to the selected process (e.g., CMOS). This bandgap voltage Vbg is provided to the positive (+) input of an operational amplifier 372, connected as shown, in a feedback loop having gain, to provide supply voltage Vdd as an integral multiple of the bandgap voltage Vbg.

AN EXEMPLARY DATA STREAM

As mentioned hereinabove, information (data) from the transponder is transmitted to the external reader/interrogator in the form of a data stream, a portion of which is the temperature count $N_T$, another portion of which is the pressure count $N_P$, and another portion of which represents the state (e.g., "closed" or "open") of the MTMS switch (220). Remaining portions of the data stream may contain information which is personalized to a given transponder unit such as its ID information (e.g., serial number), calibration constants, and the like.

FIG. 3C illustrates an exemplary architecture for information which is stored in memory (e.g., 238) within the transponder 200, as well as a data stream which is transmitted by the transponder 200 to the external reader/interrogator 106, 166. The memory 238 of the transponder core 204 has, for example, a 144-bit address space which includes 119 (one hundred nineteen) bits of programmable memory and one address location dedicated to the state of the MTMS switch 220—these 120 (one hundred twenty) bits of programmable memory constituting the EEPROM 136—plus two 12-bit temperature and pressure registers 232 and 234, respectively.

Each of the 119 programmable memory bits can separately be written to with any combination of data, including synchronization (sync) pattern information, general data, error checking codes, and temperature and pressure calibration data. The EEPROM is 'block writeable', meaning that in the 'write' mode, the entire 120 bits of EEPROM are programmed to a logical (binary) value of "1". Individual bits can be 'erased' (set to a logical value of "0" simply by clocking the chip to the bit's physical address and placing the chip into the 'erase' mode). The address location is preserved.

In this example, the first twelve data locations (000 . . . 011 in ROW 1) are reserved for sync. The next seventy one data locations (012 . . . 082 in ROWs 2 through 7) are for general information and a value for a data validation algorithm such as CRC (Cyclic Redundancy Check). The next data location (083) contains the logic level (state) of the MTMS switch 220. A logical value of "1" indicates that the MTMS switch is open and a logical value of "0" indicates that the MTMS switch is closed.

As will be detailed hereinbelow, each transponder unit is suitably calibrated prior to its installation in a tire. This basically involves determining a slope and a "defining point" for "point-slope form" linear equations which characterize the temperature and pressure values generated by the transponder at various temperatures and pressures in a test chamber, and programming these characteristic calibration values associated with the transponder into the transponder's memory space. The next twelve data locations (084 . . . 095 in ROW 8) hold temperature calibration (e.g., defining point) data "TEMP COMP"). The next twelve data locations (096 . . . 107 in ROW 9) hold pressure calibration (e.g., defining point) data "PRESS COMP"). The next twelve data locations (108 . . . 113 and 114 . . . 119 in ROW 10) hold calibration (e.g., slope) information for temperature and pressure, respectively.

As described hereinabove, it has been determined that characteristic values for the slope of the $N_T/N_P$, or "ratioed" response of temperature count divided by pressure count, is linear with respect to the value of the pressure-sensing capacitor $C_P$, thereby greatly simplifying the calculation of pressure compared to a calculation involving only the "pressure" count $N_P$ which is actually a hybrid of pressure and temperature. Therefore, the pressure slope and defining point calibration values which are stored in the transponder memory and included in the data stream transmitted to the external reader/interrogator are determined using the ratio $N_T/N_P$ rather than the "pressure" count $N_P$. The calibration procedure will be described in detail hereinbelow.

As counts $N_T$ and $N_P$ for temperature and pressure are generated, as described hereinabove, they are stored in ROWs 11 and 12 of the overall memory space, which correspond to the temperature and pressure registers 232 and 234, respectively. Various predetermined values can be stored to indicate error conditions such as overflow and short-circuit.

OPERATING FREQUENCIES AND MODULATION

The transponder of the present invention is not limited to any particular operating frequency. The choice of operating frequency will depend largely upon factors such as where the transponder is mounted in relationship to the object it is monitoring, the location of the reader/interrogator antenna (108), and relevant government regulations permitting (conversely, restricting) data transmissions of the type set forth herein in selected portions of the overall RF frequency spectrum.

An example of suitable operating frequencies for operating the transponder in the United States is 60 KHz to 490 KHz.

The transponder can be polled (and powered) by the reader/interrogator 106, 166 at a first "interrogation" frequency (Fi), and the data stream can be transmitted back to the reader/interrogator at a second "data carrier" frequency (Fc) which is, conveniently, a whole number multiple or fraction of the interrogating frequency. For example, Fc=Fi/

2. Or, Fc=Fi/4. The frequency (Fc) at which the data stream is transmitted back to the reader/interrogator is independent of the data rate, which is established by the clock generator 224 and the baud rate generator 248. However, one having ordinary skill in the art to which the present invention most nearly pertains will recognize that the range of available baud rates will typically be significantly less than the interrogation frequency (Fi). The baud rate is preferably derived from the interrogation frequency (Fi) of the reader/interrogator, such as a whole number fraction thereof. For example, the baud rate may be set at Fi/32 (or, in the case of Fc=Fi/2, the baud rate can be set to Fc/16).

For example, the interrogation frequency (M) may be 125 KHz, and the data carrier (Fc) may be set to 62.5 KHz, or half of the interrogation frequency.

In another example, an interrogation frequency (Fi) of 13.56 MHz has been found to be suitable.

The data stream, such as the exemplary data stream described with respect to FIG. 3C is impressed by the modulator circuit 246 onto the antenna 212, and transmitted to the reader/interrogator 106, 166. It is within the scope of this invention that any suitable modulation scheme be employed, including amplitude modulation (AM), frequency modulation (FM), frequency shift keying (FSK), and phase shift keying (PSK). However, phase shift keyed (PSK) is preferred. AM modulation is not particularly well-suited to digital transmission. Frequency modulation schemes such as FM or FSK may be somewhat problematic with regard to propagating the data-modulated transponder output signal through the medium of a pneumatic tire (e.g., 104).

RATIO VERSUS SIGNAL STRENGTH

An added advantage of using the ratio $N_T/N_P$ for a pressure indicator accrues because it has been determined that the ratioed value is less sensitive to variations in coupling between the reader/interrogator and the transponder than either of the $N_T$ and $N_P$ measurements taken alone. This is illustrated in FIG. 7 which shows a graph 700 of measurement counts (on vertical axis 704) versus power (on horizontal axis 702). For a passive transponder 200 such as described in the preferred embodiment of this invention, the transponder power is supplied by the RF signal from the reader/interrogator (e.g., 106, 166). If the RF coupling strength weakens due to transmission or reception problems including excessive distance or interference, then the power in the transponder 200 circuitry may decrease. It has been determined that for power levels below a certain value $PWR_1$, the relaxation oscillator 312 outputs a lower than normal frequency signal Fosc' and thus reduces the temperature and pressure counts $N_T$ and $N_P$ below what they should be for a given temperature or pressure. The effect is illustrated by the downward curve on the plot 710 of temperature count $N_T$ and on the plot 720 of pressure count $N_P$ as the plots extend below the minimum power $PWR_1$. Fortuitously, the low-power effect is proportionally the same for both counts, so that the ratio $N_T/N_P$ (plot 730) becomes relatively steady for all power levels down to a minimum power $PWR_0$ needed to operate the transponder 200. Thus, by determining (during calibration) and storing calibration data for the ratioed value of $N_T/N_P$ in the transponder, the ability to determine a pressure-only reading which is relatively insensitive to coupling variations between the reader/interrogator and the transponder is both simplified and made more reliable.

DECODING THE TRANSPONDER SIGNALS IN A READER/INTERROGATOR

FIG. 4 illustrates a relevant portion 400 of a reader portion of a reader/interrogator (e.g., 106, 166). It should be clearly understood that the transponder 200 of the present invention is suitable for use with virtually any suitably configured reader/interrogator. The description that follows is limited to broad architectural functions that would be performed in the reader/interrogator. One having ordinary skill in the art to which the present invention most nearly pertains would be able, from the description set forth herein, to implement these functions in an otherwise "generic" reader/interrogator.

The data-modulated transponder output signal is received by the antenna 410 (compare 110, 160, 210) of the reader/interrogator 400 (compare 106, 166). The received signal is de-modulated and de-coded in a de-modulator/decoder circuit 420 (DE-MOD/DECODE) so that the different portions of the data stream can be properly segregated from one another. The data relating to temperature and pressure calibration (TEMP COMP, PRESS COMP, TEMP/PRESS SLOPES), the temperature count ($N_T$) and the pressure count ($N_P$) are provided to an arithmetic logic unit 422 (ALU) capable of generating a calibrated pressure-only signal "PRESSURE") on a line 423 to the display 412 (compare 112, 162) as well as a calibrated temperature signal "TEMPERATURE") on the line 423. As described hereinabove, the reader/interrogator 400 may be designed to use the temperature and pressure signals to calculate (in the ALU 422) a "cold" tire pressure, or a similar reading indicative of the actual amount of air present in the pneumatic tire 104. The reader/interrogator 400 may also include a barometric pressure sensor so that a gauge pressure can be calculated from the typically absolute pressure reading of the transponder pressure sensing capacitor $C_P$ 218. This information can be displayed to the user either selectively or simultaneously with other relevant information such as the state of the MTMS switch 220, as well as data (DATA) relating to tire identification and the like.

NORMALIZING DATA COMING FROM THE TRANSPONDER

There has been described, hereinabove, an exemplary RF transponder 200 capable of measuring temperature and pressure within a pneumatic tire 104, and transmitting digital information indicative thereof to a remote reader/interrogator 400. There are now described techniques whereby information is stored and transmitted by a transponder, the transponder is calibrated, and information from the transponder is decoded by an external reader (e.g., reader/interrogator 106, 166, 400).

Briefly, an oscillator 312 is operated during two timing windows ($W_T$ and $W_P$). During the first timing window $W_T$, the frequency Fosc' of the oscillator 312 is a function of a temperature-dependent scaled current (I(T)/N) that is dependent on the temperature of a diode (Q1) junction. A temperature count (or "reading") $N_T$ is captured and accumulated in the temperature register 232 during this first timing window $W_T$. During the second timing window $W_P$, the oscillator frequency Fosc' is changed by switching in the pressure sensor capacitance $C_P$. As noted hereinabove, this approach causes the oscillator frequency Fosc' during the second timing window $W_P$ to be a function (hybrid) of both pressure and temperature. A "pressure" count (or "reading") $N_P$ is captured and accumulated in the pressure register 234 during this second timing window $W_P$. (The so-called pressure count $N_P$ is understood to be, in actuality, the hybrid of pressure and temperature, as detailed hereinabove.)

As mentioned hereinabove, the timing windows ($W_T$ and $W_P$) may either be of substantially equal duration or of unequal duration. For example, the timing windows may suitably be of equal duration to one another, such as 8.192 ms.

The temperature and pressure counts ($N_T$ and $N_P$) generated by the transponder are loaded at the end of the timing windows ($W_T$ and $W_P$) into the temperature and pressure registers (232 and 234) in the IC and become part of an overall digital transponder transmission (data stream). For example, a transponder transmission may consist of 144 bits (compare FIG. 3C), arranged as follows:

12 sync bits;

71 programmable identification and error check bits;

1 bit representing the state of the MIMS switch 220;

36 calibration bits;

12 bits representative of the temperature count ($N_T$); and 12 bits representative of the pressure count ($N_P$).

As mentioned above (e.g., with respect to FIG. 4), the transponder transmission is received by an external reader/interrogator 400, whereupon the temperature and pressure counts ($N_T$ and $N_P$) may be stripped from the received data stream and operated upon (e.g., by ALU 422) using the calibration information in the 36 calibration bits, to generate a calibrated temperature signal and a calibrated pressure (only) signal.

TEMPERATURE AND PRESSURE RESPONSES

As mentioned above, the oscillator frequency during the second timing window $W_P$, hence the pressure count "$N_P$" is a function of both pressure and temperature—hence, the pressure count "$N_P$" is not a linear function of pressure.

According to the invention, even though the "pressure" count $N_P$ is a hybrid function of both pressure and temperature (because of the transponder design), a ratio $N_T/N_P$ is a linear function of pressure, and pressure only. (As explained hereinabove, this assumes that the capacitive pressure sensor 218 responds with a capacitance $C_P$ which is related in a reasonably linear way to pressure.) Using the ratio $N_T/N_P$ in a linear equation makes the determination of pressure from transponder counts simpler and more accurate than using the "pressure" count $N_P$. (To calculate pressure from the pressure count $N_P$ requires a nonlinear equation, such as a polynomial, and also requires temperature-related correction factors. A linear approximation of this nonlinear equation would be subject to significant inaccuracies for pressures only slightly more or less than the center point of the linear approximation curve.)

FIG. 5A is a graph 500 illustrating the temperature response of the transponder. The horizontal axis 502 represents temperature (T), the vertical axis 504 represents temperature count ($N_T$), and a line 506 is characteristic of the temperature response of the transponder. As illustrated by the line 506, the temperature count ($N_T$) varies substantially as a linear function of the temperature (T). The line 506 has a negative slope: i.e., the temperature count $N_T$ decreases as the temperature T increases. (Recall from above that the base-emitter voltage of the transistor Q1 will vary by a predictable amount of −2.2 mv/° C.) A defining point 508, the significance of which is discussed below, is shown at the coordinate ($T_1, N_{T1}$) on the line 506.

FIG. 5B is a graph 510 illustrating the pressure response of the transponder. The horizontal axis 512 represents pressure (P), and the vertical axis 514 represents a ratio ($N_T/N_P$) of transponder's temperature count ($N_T$) divided by its pressure count ($N_P$). As illustrated by the line 516, the ratio $N_T/N_P$ varies substantially as a linear function of the pressure (P) and has a positive slope ($N_T/N_P$ increases as the pressure P increases). A defining point 518, the significance of which is discussed below, is shown at the coordinate ($P_1, N_T/N_P$) on the line 516.

EQUATIONS FOR THE TEMPERATURE AND PRESSURE RESPONSE LINES

Various forms of equations may be employed to describe a line (such as the two point method) or additional points for a non-linear form such as the lines 506 and 516 in the graphs of FIGS. 5A and 5B, one of which is the "point-slope" form in which a line is represented by a "defining point" and a slope. This form is preferred, because the defining points can be selected to be at the temperature and pressure of greatest interest, thereby ensuring that slope and linearity errors in the line are (by definition) zero at the defining point. Evidently, these errors, if any, would increase as the temperature or pressure of measurement move away from the defining point. For the same reasons, the slope should be determined from points nearby the defining point. For purposes of the discussion that follows, the temperature and pressure of interest, where greatest accuracy is desired, are selected to be:

$T_1$=25° C. (approximately 77° F.); and $P_1$=700 kPa (approximately 102 PSI)

(Note that 700 kPa is exemplary of a nominal pressure for common truck tires, and that a nominal pressure for common passenger car tires would be about one third of that.) The point-slope form for a line, in general terms is:

$$(y-y_1)=m(x-x_1)$$

where:

($x_1, y_1$) is the defining point; and m is the slope.

The slope (m) can be determined from any two points on the line: ($x_1, y_1$), ($x_2, y_2$):

$$m=(y_2-y_1)/(x_2-x_1)$$

Substituting for x and y, the specific equation for the temperature line 506 becomes:

$$N_T-N_{T1}=m_T(T-T_1)$$

Choosing 25° C. for $T_1$ yields the equation:

$$N_T-N_{T25}=m_T(T-25)$$

Solving for $N_T$ yields the following equation for the line 506:

$$N_T=m_T(T-25)+N_{T25} \qquad [\text{EQ. 1}]$$

wherein the slope $m_T$ of the line 506 is:

$$m_T=(N_{T2}-N_{T1})/(T_2-T_1) \qquad [\text{EQ. 2}]$$

In a similar manner, the equation for the $N_T/N_P$ line 516 can be established. Choosing a pressure of 700 kPa (at a temperature of 25° C.) for the defining point P1, the equations become:

$$N_T/N_P=m_P(P-700)+N_T/N_{P700,25} \qquad [\text{EQ. 3}]$$

wherein the slope $m_P$ of the line 516 is:

$$m_P=(N_T/N_{P2}-N_T/N_{P1})/(P_2-P_1) \qquad [\text{EQ. 4}]$$

CALIBRATING THE TRANSPONDER

The purpose of calibrating the transponder is to generate values for "calibration constants" $N_{T25}$, $m_T$, $N_T/N_{P700,25}$ and $m_P$ to be used in linear equations (set forth hereinabove) for the lines 506 (temperature response) and 516 (pressure-only response) which will calculate temperature and pressure from the transponder temperature and pressure counts $N_T$ and $N_P$. Due to variances in the manufacturing of the ICs and the pressure sensors, the values of the calibration constants cannot be assumed to be the same for all transponders without introducing large errors in the calculations of temperature and pressure.

During calibration, the transponder (e.g., 200) is exposed to a number of predetermined temperatures and pressures, and the $N_T$ and $N_P$ counts from the transponders are recorded. Using equations EQ. 1 to EQ. 4, these counts are converted to the calibration constants $N_{T25}$, $m_T$, $N_T/N_{P700,25}$ and $m_P$ that are stored (e.g., as the 36 calibration bits discussed hereinabove) in the transponder memory 236 for subsequent transmission to a reader/interrogator (e.g., 400). The reader/interrogator 400 utilizes these calibration constants, along with real-time temperature and pressure data (counts $N_T$ and $N_P$) to calculate the temperature at and pressure acting upon the sensor associated with the transponder 200. The air within a tire with which the transponder 200 is associated would then be pressured to be substantially identical to the transponder temperature. The tire during its rotation under load generates the heat that raises the internal air temperature about ambient levels.

FIG. 6A illustrates a calibration system 600 comprising a calibration chamber 602 capable of receiving one or more transponders 604 (compare 200) so as to subject the transponder(s) 604 to a number of predetermined temperatures and pressures. FIG. 6B is a flowchart illustrating the calibration procedure 650.

As illustrated in step 652 of FIG. 6B, the transponder 604 is exposed to a number of temperatures and pressures, at a number of distinct calibration (measurement) points (A–E). For example:
- A) 25° C., 600 kPa (defining point temperature, below-defining point pressure)
- B) 25° C., 700 kPa (defining point temperature, defining point pressure)
- C) 25° C., 800 kPa (defining point temperature, above-defining point pressure)
- D) 0° C., 700 kPa (below-defining point temperature, defining point pressure)
- E) 50° C., 700 kPa (above-defining point temperature, defining point pressure)

It should be understood that AT LEAST THREE measurements should be taken to calibrate the transponder:
1. a first measurement at a first temperature and a first pressure (e.g., B), preferably at the defining point temperature and defining point pressure;
2. a second measurement at a second temperature and second pressure which may be equal to the first pressure (e.g., D); and
3. a third measurement at the first or second temperature, at a third pressure which is different from the first or second pressure, respectively (e.g., A).

Additional readings can be taken at additional calibration points, for example:
- F) 0° C., 600 kPa
- G) 0° C., 800 kPa
- H) 50° C., 600 kPa
- I) 50° C., 800 kPa At each measurement point, the transponder 604 is exercised (e.g., in the case of a passive transponder polled/powered by an external reader/interrogator 610 or, in the case of an active transponder, simply powered up), and two values are generated by the transponder: a temperature count $N_T$ and a pressure count $N_P$. It is within the scope of the invention that, rather than transmitting these counts in an RF signal, the temperature and pressure counts may be directly read by probing exposed terminals on the transponder 604, which may be only partially packaged. As illustrated, a reader 610 (compare 400) receives the transponder transmission and provides the temperature and pressure counts to a microprocessor-based controller 620.

The controller 620 controls one or more heating elements 622 disposed within the calibration chamber 602 and a pressurized air supply 624 in fluid communication with the calibration chamber 602 in response to a stored calibration protocol or to temperature and pressure setpoint inputs 626 and 628, respectively. In order to determine the actual temperature and pressure in the calibration chamber 602, highly accurate temperature and pressure sensors 612 and 614, respectively, are disposed suitably in the calibration chamber 602, preferably close to the transponder 604 being calibrated. The controller 620 can use the sensors 612 and 614 for feedback control of the calibration chamber 602 temperature and pressure, or can display their readings to an operator manually controlling the procedure.

When changing from a temperature to another temperature, the temperature in the chamber 602 is first allowed to "settle" before a temperature measurement is taken (i.e., before the temperature count $N_T$ is read by the reader 610). In a similar manner, when changing from a one pressure to another pressure, the pressure in the chamber 602 is first allowed to "settle" before a pressure measurement is taken (i.e., before the pressure count $N_P$ is read by the reader 610).

In order to ensure accuracy, at each calibration point (e.g., at each of the five calibration points A . . . E), actual "reference") values for the temperature and pressure within the chamber are generated by the highly accurate sensors 612 and 614, respectively. These reference values become the independent variables in the line equations EQ. 1 to EQ. 4, particularly to calculate the slopes $m_T$ and $m_P$ of the lines 506 and 516, respectively. Since the equations used by a reader/interrogator according to this invention assume that the defining point counts ($N_{T1}$, $N_{P1}$) are exactly at the selected point of interest (25° C., 700 kPa for this example), the controller 620 must either obtain counts ($N_{T25}$, $N_{P700,25}$) when the chamber 602 is at the proper reference values (25° C., 700 kPa), or must use multiple reference values and their corresponding recorded counts to interpolate the value for the count at the defining point.

The exemplary transponder values (five temperature counts and five pressure counts) recorded during a calibration run and the associated reference values are summarized in the following table.

| | Calibration Count and Reference Variable Table | | | |
| --- | --- | --- | --- | --- |
| | Temp Counts | Press Counts | Ref Temp | Ref Press |
| A) | $N_{T25}$ | $N_{P600,25}$ | $T_{25}$ | $P_{600,25}$ |
| B) | $N_{T25}$ | $N_{P700,25}$ | $T_{25}$ | $P_{700,25}$ |
| C) | $N_{T25}$ | $N_{P800,25}$ | $T_{25}$ | $P_{800,25}$ |
| D) | $N_{T0}$ | $N_{P700,0}$ | $T_0$ | $P_{700,0}$ |
| E) | $N_{T50}$ | $N_{P700,50}$ | $T_{50}$ | $P_{700,50}$ |

These values are stored (step 654 of FIG. 6B) in the controller 620 and, as will be seen, are used to generate four calibration constants $N_{T25}$, $m_T$, $N_T/N_{P700}$ and $m_P$ (also referred to as calibration constants "A", "B", "C" and "D", respectively) for characterizing the temperature and pressure-only response curves 506 and 516, respectively.

Prior to calculating the calibration constants, the temperature and pressure counts ($N_T$ and $N_P$) received from the transponder are range checked to ensure that they are within certain predetermined ranges (step 656 of FIG. 6B). Transponders that have temperature and pressure counts that fall outside of these ranges are considered defective and may be rejected prior to being calibrated.

The range check procedure 656 is as follows:

1) $N_{T25}$ ("temperature defining point" i.e., the count at the defining point of the temperature response line 506): Must fall within a predetermined range of counts.

2) $N_{T50}$ and $N_{T0}$: The difference between these two counts represents the slope of the temperature response line 506. The absolute value of the difference must fall within a predetermined range of counts.

3) $N_{P700,25}$ ("pressure defining point" i.e., the count at the defining point of the pressure-only response line 516): Must fall within a predetermined range of counts.

4) $N_{P600,25}$ and $N_{P800,25}$: The difference between these two counts represents the slope of the pressure-only response line 516. The absolute value of the difference must fall within a predetermined range of counts.

The calibration constants are then calculated (step 658, FIG. 6B) for the transponders that pass the range check, as follows:

Temperature defining point at 25° C. ($N_{T25}$) (Calibration Constant A): The $N_{T25}$ value is the temperature count $N_T$ generated by the transponder 604 when it is known (via reference temperature sensor 612) to be at a temperature of 25° C. This value is converted to binary, and is assigned a suitable number of binary bits (e.g., 10 bits). The conversion optionally includes subtracting a minimum value (e.g., 1900) from the raw count value in order to zero-base the range of values for the constant.

Temperature Slope ($m_T$) (Calibration Constant B): The slope $m_T$ of the temperature response line 506 is (from above):

$$m_T = (N_{T2} - N_{T1})/(T_2 - T_1) \quad \text{[EQ. 2]}$$

The temperatures $T_2$ and $T_1$ can be any two reference temperatures, and $N_{T2}$ and $N_{T1}$ are the corresponding temperature counts ("calibration temperature readings"). One of the temperatures ($T_1$) is conveniently the temperature used as the temperature defining point with reading $N_{T25}$, and the other temperature ($T_2$) is conveniently plus or minus 25° C. from the temperature defining point. Preferably, however, the two temperatures $T_2$ and $T_1$ are as far apart from one another as possible, straddling the temperature defining point, and within the operating range of the transponder (and more preferably within the anticipated temperature range of the tire), since a greater span between the two temperature points will inherently provide greater resolution and accuracy for the slope of the temperature line. For example, two temperatures, such as 50° C. and 0° C. which are in addition to the temperature defining point (25°) provide a large span for calculating the slope of the line 506. Using values at two points straddling the temperature defining point also allows two more slope calculations (between the endpoints and the defining point) as a check for non-linear response and for calibration procedure errors.

Substituting these values for $N_{T2}$ and $N_{T1}$ in EQ. 2 yields the following equation for the slope $m_T$ of the temperature response curve 506:

$$m_T = (N_{T50} - N_{T0})/(T_{50} - T_{T0}) \quad \text{[EQ. 5]}$$

The value of $m_T$ (i.e., the slope of the temperature response line 506) is a negative number, and must fall within a range of a predetermined number of counts per ° C. (as determined by the range check on $N_{T50} - N_{T0}$). Any transponder having a temperature response slope falling outside of this range can be rejected. A binary conversion is performed, and the result is assigned a suitable number of binary bits (e.g., 7 bits). The conversion optionally includes multiplying the calculated slope $m_T$ by a number (e.g., −20) to turn the value into a positive whole number, and then subtracting a minimum value (e.g., 60) in order to zero-base the range of values for the constant.

Pressure Defining Point (Calibration Constant C): A value for the pressure defining point $N_T/N_{P700,25}$ is calculated by dividing the temperature counts $N_T$ generated by the transponder 604 when it is known (via reference temperature sensor 612) to be at a temperature of 25° C., by the pressure counts $N_P$ generated by the transponder 604 when it is known (via reference sensors 612, 614) to be at a pressure of 700 kPa and a temperature of 25° C. A binary conversion is performed, and the result is assigned a suitable number of binary bits (e.g., 12 bits). The conversion optionally includes multiplying the calculated ratio by a number (e.g., 1000) to turn the value into a positive whole number, and then subtracting a minimum value (e.g., 2400) in order to zero-base the range of values for the constant.

Pressure slope ($m_P$) (Calibration Constant D): The slope mp of the pressure response line 516 is (from above):

$$m_P = (N_T/N_{P2} - N_T/N_{P1})/(P_2 - P_1) \quad \text{[EQ. 4]}$$

As was the case with calculating the slope of the temperature line 506, preferably two pressure values ($P_1$, $P_2$) are used (providing they are at the same temperature): preferably representative of the operating range of pressures, and preferably on either side of the defining pressure value. The resulting pressure counts "calibration pressure readings") are $N_P$ and $N_{P2}$, respectively. Two calibration pressures, such as 600 kPa and 800 kPa are employed for example, both at the same temperature (e.g., 25° C.) and spanning the pressure defining point (700 kPa) so as to provide a large span for greater resolution and accuracy. Also, using values at two points straddling the pressure defining point allows two more slope calculations (between the endpoints and the defining point) as a check for non-linear response and for calibration procedure errors. Substituting these values for $N_T/N_{P2}$ and $N_T/N_{P1}$ in EQ. 4 yields the following equation for the slope $m_P$ of the pressure response curve 516:

$$m_P = (N_T/N_{P600,25} - N_T/N_{P600,25})/(800 - 600) \quad \text{[EQ. 6]}$$

The value of $m_p$ is a positive number, and must fall within a predetermined, acceptable range (as determined by the range check on $N_{P800,25} - N_{P600,25}$) Any transponder having a pressure response slope falling outside of this range can be rejected. A binary conversion is performed, and the result is assigned a suitable number of binary bits (e.g., 7 bits). The conversion optionally includes multiplying the calculated slope $m_p$ by a number (e.g., 10000) to turn the value into a positive whole number, and then subtracting a minimum value (e.g., 40) in order to zero-base the range of values for the constant.

When the above steps are completed, the binary values of the four calibration constants $N_{T25}$, $m_T$, $N_T/N_{P700}$ and mp are concatenated (step 660, FIG. 6B) into a single string of calibration bits (e.g., 36 bits). These bits are stored (step 662, FIG. 6B) in the transponder 604 in the bit cells assigned for calibration bits (e.g., rows 8, 9 and 10 of FIG. 3C). The concatenated string 680 of calibration constants ($N_{T25}$, $m_T$, $N_T/N_{P700}$ and $m_p$, respectively) is illustrated in the exemplary bit map of FIG. 6C.

READING THE TRANSPONDER

The reader (e.g., reader/interrogator 106, 166, 400) utilizes these calibration constants (682, 684, 686 and 688) as received from the transponder, along with real-time temperature and pressure counts $N_T$ and $N_P$ from the transponder to calculate the temperature and pressure sensed by the transponder, hence of the object (e.g., air within the tire) with which the transponder is associated.

When data (including both counts and calibration constants) from the transponder 200 is received by the reader 400, the reader 400 converts the counts to engineering units using the calibration constants 682 . . . 688 as terms of the equations. The equations stored in the reader 400 are the same as those used to generate the calibration constants, except now the counts are the independent variable and the temperature and pressure are the dependent variables.

Reader Temperature Equations: The equation [EQ. 1] ($N_T = m_T(T-25) + N_{T25}$) for the temperature response line 506 is rearranged to solve for temperature (T) as the dependent variable, as follows:

$$T = ((N_T - N_{T25})/m_T) + 25° \text{ C.} \quad [\text{EQ. 7}]$$

where:

$N_T$ is the count received from reading the transponder;

$N_{T25}$ is Calibration Constant A; and $m_T$ is Calibration Constant B.

(It should be understood that the calibration constants and the temperature count are re-converted to decimal numbers in the reader for use in the equation [EQ. 7]. Also any of the optional manipulations of the calibration constants described hereinabove with respect to the binary conversion must be known to the reader so they can be reversed.)

Reader Pressure Equations: The equation [EQ. 3] ($N_T/N_P = m_p(P-700) + N_T/N_{P700,25}$) for the pressure response line 516 is rearranged to solve for pressure (P) as the dependent variable, as follows:

$$P = ((N_T/N_P - N_T/N_{P700,25})) + 700 \quad [\text{EQ. 8}]$$

where:

$N_T/N_P$ is the temperature count $N_T$ divided by the pressure count $N_P$, both as received from the transponder;

$N_T/N_{P700,25}$ is Calibration Constant C; and $m_p$ is Calibration Constant D.

(It should be understood that the calibration constants and the counts are re-converted to decimal numbers in the reader for use in the equation [EQ. 8]. Also any of the optional manipulations of the calibration constants described hereinabove with respect to the binary conversion must be known to the reader so they can be reversed.)

In this manner, calibrated temperature T and pressure P (pressure-only) readings are obtained from the transponder. These readings may be displayed in any suitable manner, in any desired units, and can be combined to derive other information about the ambient conditions (such as mass of the air contained in a pneumatic tire).

It will be understood by those skilled in the art that certain calculations, such as those involving the ideal gas law (PV=$\mu$RT) require the use of absolute pressure and temperature. It is also known that pressure transducers most suitable for use inside the pneumatic tires of the embodiment described herein typically measure absolute pressure. It is assumed in the description of this patent that pressure and temperature values are converted as needed to appropriate forms and in appropriate units in calculations such as in the calibration process 650, and in the reader/interrogator 400.

As mentioned hereinabove, an important advantage of the invention is that for the transponder 200 of this invention, the relationship between $N_T/N_P$ and the pressure sensor capacitance is linear, and independent of the temperature measurement of the transponder 200, thereby greatly simplifying the design of the reader/interrogator 400.

In practice, it has been observed that other benefits may accrue to the invention, and the data transmitted by the transponder 200 is also normalized with respect to (relatively insensitive to) power drops, coupling strength variations, leakage currents and the like.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of monitoring pressure in a pneumatic tire, comprising:

sensing ambient temperature within the tire, and generating a first reading which is a linear function of ambient temperature only;

sensing ambient pressure within the pneumatic tire, and generating a second reading which is a hybrid, non-linear function of both ambient pressure and ambient temperature;

characterized by:

generating a reading which is a linear function of only the ambient pressure by dividing the first reading by the second reading.

2. Method, according to claim 1, characterized by:

transmitting the first and second readings from a transponder within the tire to a reader/interrogator external to the tire.

3. Method, according to claim 2, characterized by:

calculating at least one calibration constant for use in an equation which characterizes pressure responsiveness of the transponder; wherein the at least one calibration constant is based on a ratio of a calibration temperature reading which is a function of ambient temperature sensed by the transponder, to a calibration pressure reading which is a function of both ambient pressure and ambient temperature sensed by the transponder.

4. Method, according to claim 3, characterized by:

storing the at least one calibration constant in the transponder.

5. Method, according to claim 4, characterized by:

subsequently providing from the transponder the at least one calibration constant along with a real-time ambient pressure reading.

6. Method, according to claim 3, characterized in that:

the equation is expressed in the form of a line equation;

the line equation is in a point-slope form characterized by a defining point and a slope which are the calibration constants; and the calibration constants comprise:
- the defining point of a pressure response line equation; and
- the slope of the pressure response line equation.

7. Method of measuring pressure within a pneumatic tire comprising:
- in a transponder, storing calibration data related to a ratioed response of a first reading divided by a second reading, as determined during a calibration of the transponder;

characterized in that:
- the first reading is a linear function of ambient temperature within the tire only, and the second reading is a hybrid, non-linear function of both ambient pressure and ambient temperature within the tire.

8. Method, according to claim 7, characterized by:
- providing a radio frequency transponder within the tire, said RF transponder including a temperature sensor and a pressure sensor; and
- transmitting the first reading and the second reading.

9. Method, according to claim 8, further characterized by:

dividing the first reading by the second reading.

10. Method, according to claim 7, characterized by:

transmitting the calibration data related to a ratioed response of the first reading divided by the second reading, as determined during a calibration of the transponder and which is stored in the transponder.

11. Method, according to claim 8, further characterized by:

transmitting the calibration data related to a ratioed response of the first reading divided by the second reading, as determined during a calibration of the transponder and which is stored in the transponder.

* * * * *